United States Patent
Orisich et al.

(10) Patent No.: US 10,458,616 B2
(45) Date of Patent: Oct. 29, 2019

(54) FIBER OPTIC LIGHTING AND/OR SIGNALING SYSTEM FOR A VEHICLE

(71) Applicant: VALEO NORTH AMERICA INC., Seymour, IN (US)

(72) Inventors: John Orisich, Seymour, IN (US); Brant Potter, Seymour, IN (US); Kayla Greene, Seymour, IN (US); Mark Madden, Seymour, IN (US)

(73) Assignee: VALEO NORTH AMERICA INC., Seymour, IN (US)

( * ) Notice: Subject to any disclaimer, the term of this patent is extended or adjusted under 35 U.S.C. 154(b) by 0 days.

(21) Appl. No.: 15/737,984

(22) PCT Filed: Jun. 19, 2015

(86) PCT No.: PCT/US2015/036629
§ 371 (c)(1),
(2) Date: Dec. 19, 2017

(87) PCT Pub. No.: WO2016/204779
PCT Pub. Date: Dec. 22, 2016

(65) Prior Publication Data
US 2018/0299092 A1 Oct. 18, 2018

(51) Int. Cl.
*F21S 43/14* (2018.01)
*F21S 43/245* (2018.01)
(Continued)

(52) U.S. Cl.
CPC .............. *F21S 43/245* (2018.01); *B60Q 1/04* (2013.01); *B60Q 1/26* (2013.01); *F21S 43/14* (2018.01);
(Continued)

(58) Field of Classification Search
CPC ........ F21S 41/24; F21S 43/235; F21S 43/239; F21S 43/245; F21S 43/251; B60Q 1/0011; B60Q 3/62
See application file for complete search history.

(56) References Cited

U.S. PATENT DOCUMENTS 4,234,907 A    11/1980   Daniel
4,977,487 A *  12/1990   Okano ..................... B60Q 1/50
                                                        362/555
(Continued)

FOREIGN PATENT DOCUMENTS

DE    10 2004 016 130 A1    10/2005
DE    10 2008 034 791 A1    1/2010
(Continued)

OTHER PUBLICATIONS

International Search Report and Written Opinion dated Mar. 2, 2016 PCT/US2015/036629 filed Jun. 19, 2015.

*Primary Examiner* — Julie A Bannan
(74) *Attorney, Agent, or Firm* — Oblon, McClelland, Maier & Neustadt, L.L.P.

(57) ABSTRACT

A lighting device (10) for a vehicle comprising: an array of optical fibers (28), at least a portion of said array of optical fibers being arranged in at least one predetermined form (32); at least one light source (20) for generating light to be transmitted through said array of optical fibers (28); and at least one support or frame (16) comprising a receiving area adapted to receive said at least one predetermined form; said at least one support or frame (16) being adapted for use on the vehicle to provide a lighting function on the vehicle. Furthermore, a lighting device (10) for a vehicle comprising: a housing (12); a plurality of support frames (16) located in said housing (12); and a plurality of fiber optic light panels (32) received in one of said plurality of support frames (16), each of said plurality of fiber optic light panels (32) com-
(Continued)

prising a plurality of optical fibers (28); said plurality of fiber optic panels (32) being adapted to receive light from at least one light source (20) to perform at least one lighting function.

18 Claims, 25 Drawing Sheets

(51) Int. Cl.
    *F21V 8/00*          (2006.01)
    *F21S 43/239*      (2018.01)
    *B60Q 1/04*         (2006.01)
    *B60Q 1/26*         (2006.01)
(52) U.S. Cl.
    CPC ............ *F21S 43/239* (2018.01); *G02B 6/001* (2013.01); *G02B 6/0006* (2013.01); *G02B 6/0008* (2013.01)

(56) References Cited

U.S. PATENT DOCUMENTS

| | | | |
|---|---|---|---|
| 6,685,348 B2* | 2/2004 | Pastrick | B60Q 1/2665 359/841 |
| 6,874,925 B2* | 4/2005 | Page | G02B 6/0008 362/554 |
| 2008/0025039 A1* | 1/2008 | Guillermo | A42B 3/044 362/556 |
| 2009/0161378 A1* | 6/2009 | Enz | B60Q 1/2665 362/494 |

FOREIGN PATENT DOCUMENTS

| | | |
|---|---|---|
| DE | 10 2012 109 422 A1 | 4/2014 |
| DE | 20 2013 105 597 U1 | 5/2014 |
| FR | 2 997 354 A1 | 5/2014 |
| WO | 2008/011558 A2 | 1/2008 |

* cited by examiner

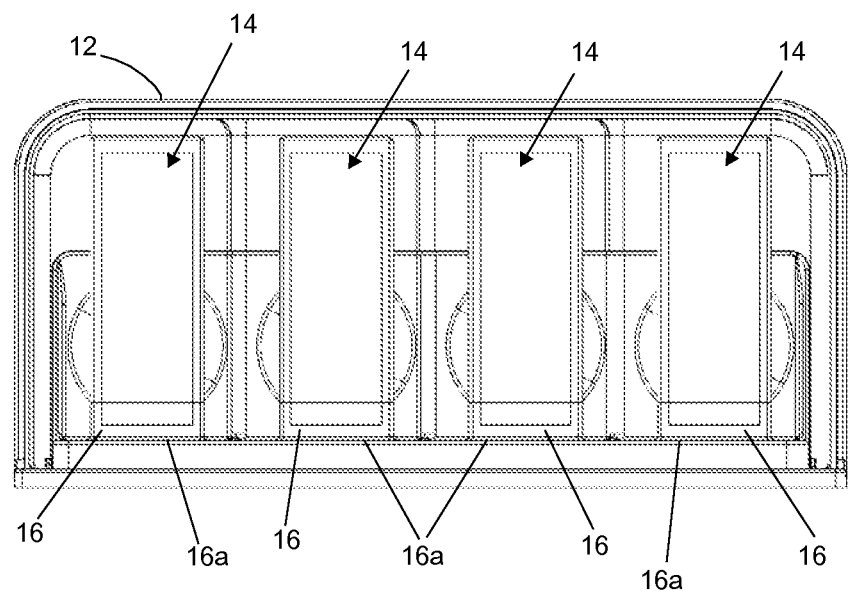
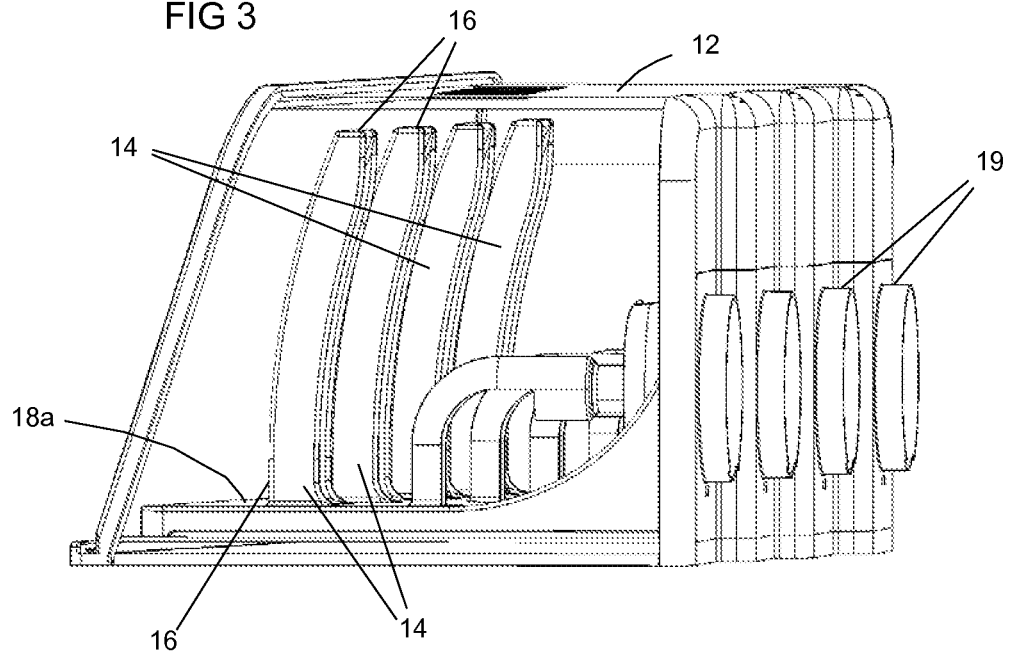

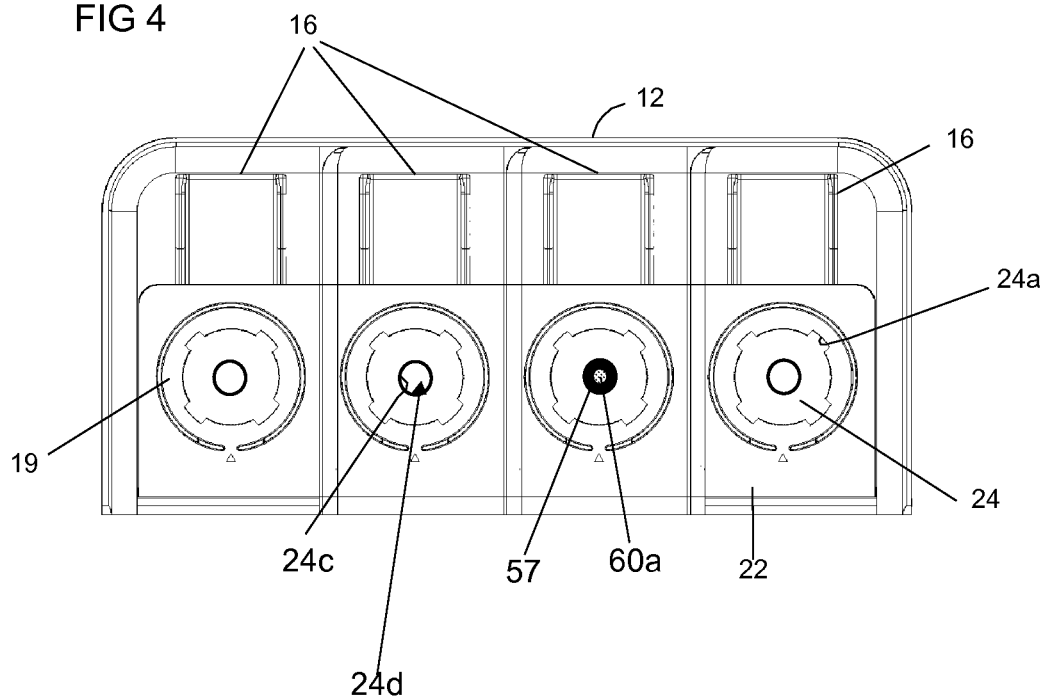
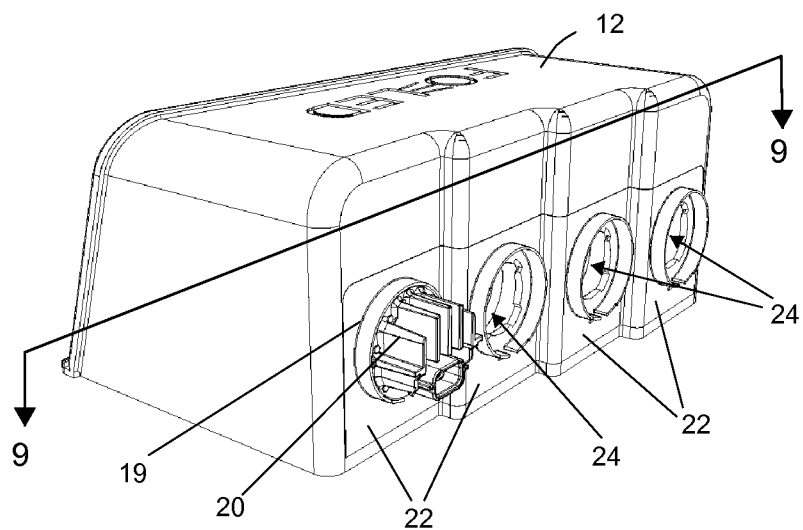

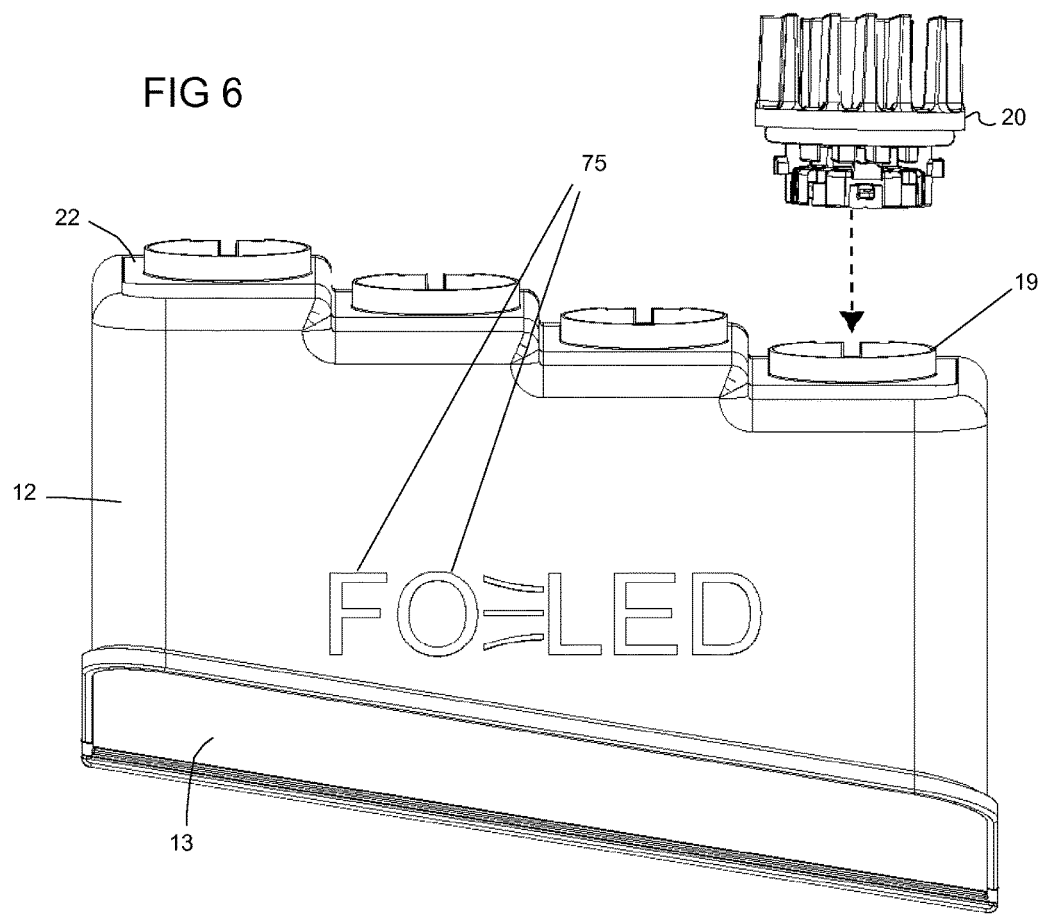

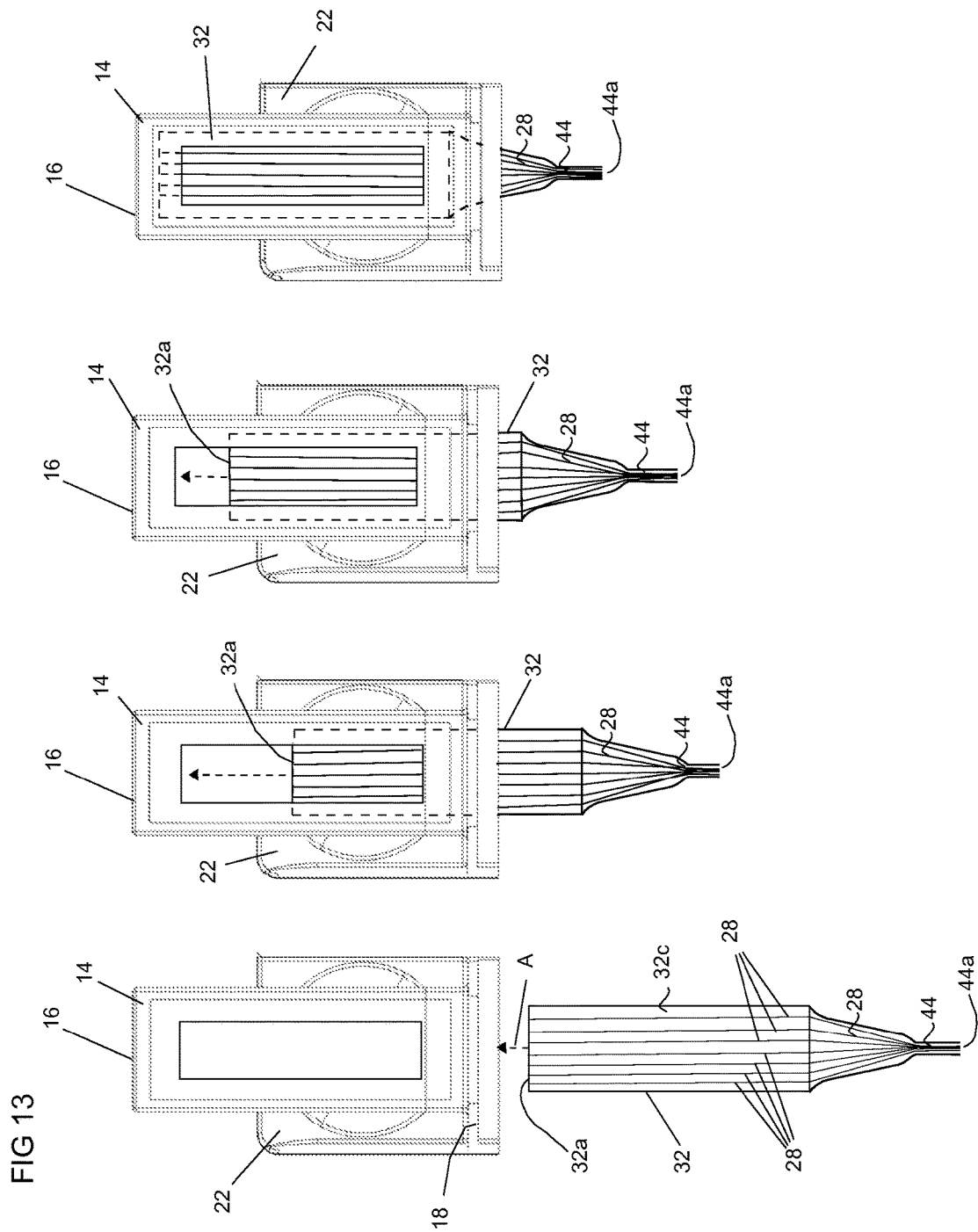

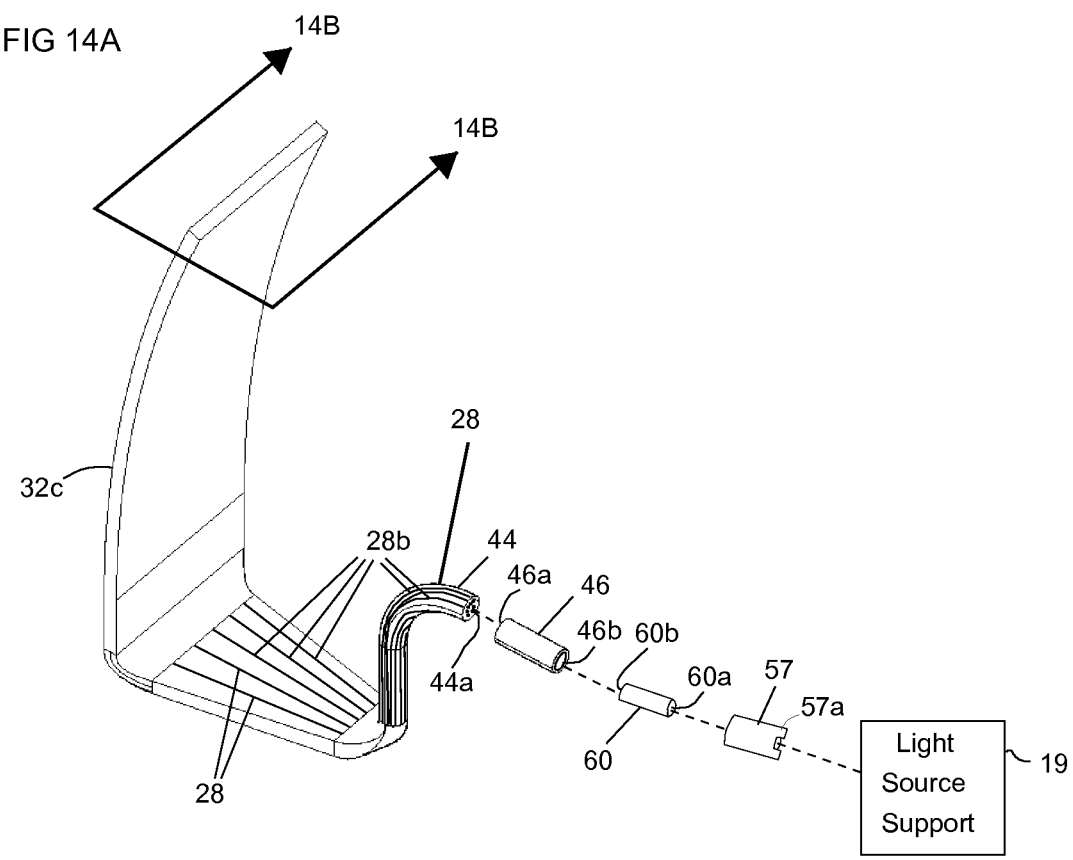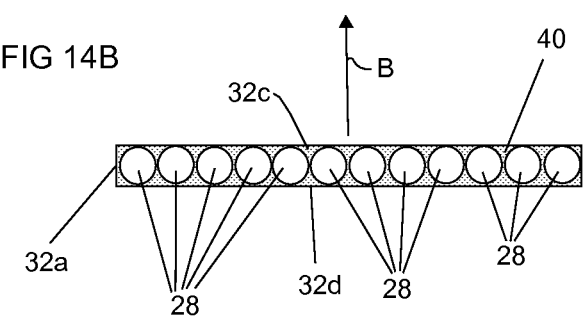

Light Emitted
From Panel

Light Acceptance
Angle (Limit 26°)

Light Emitted
From Panel

Fill Thread

Light Emitted
From Panel

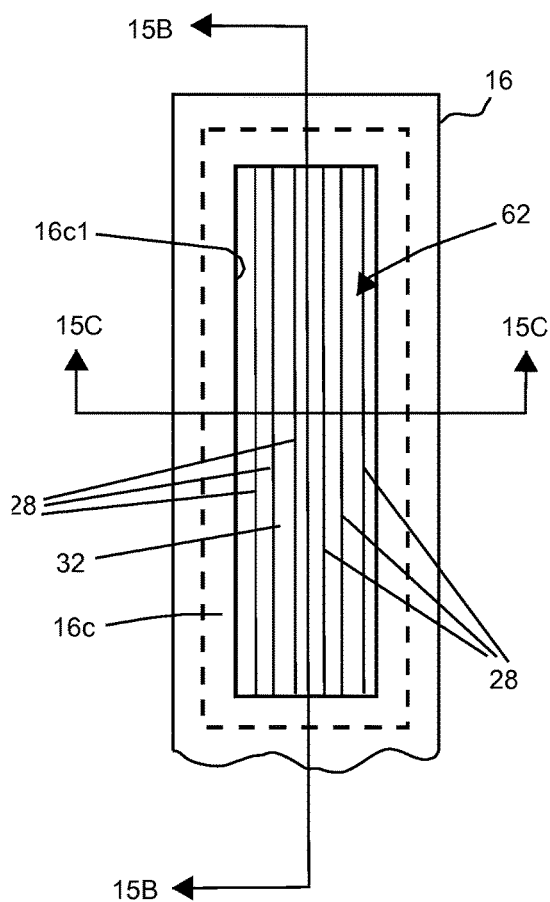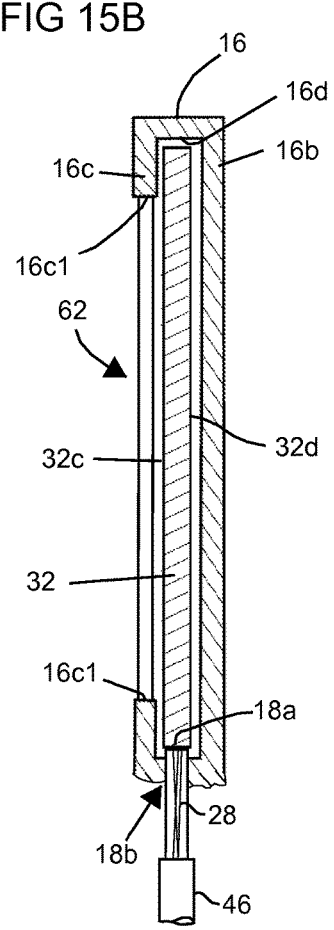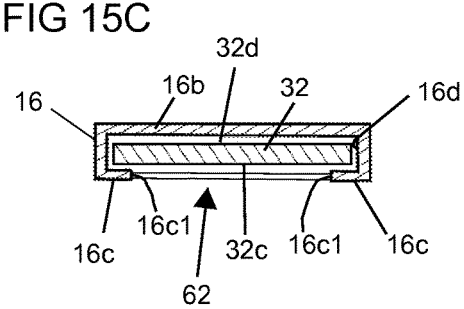

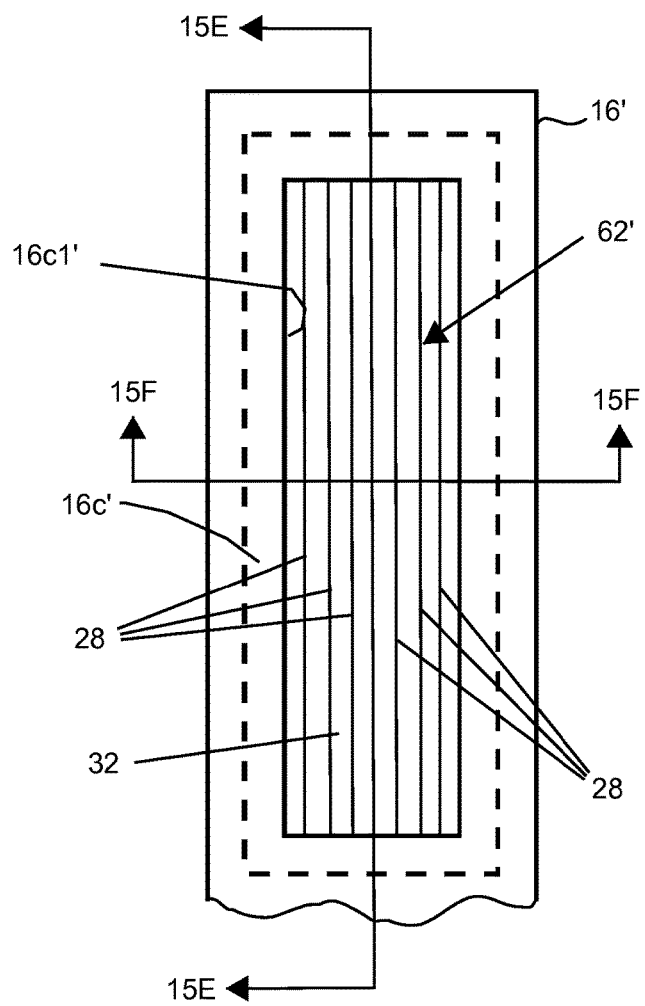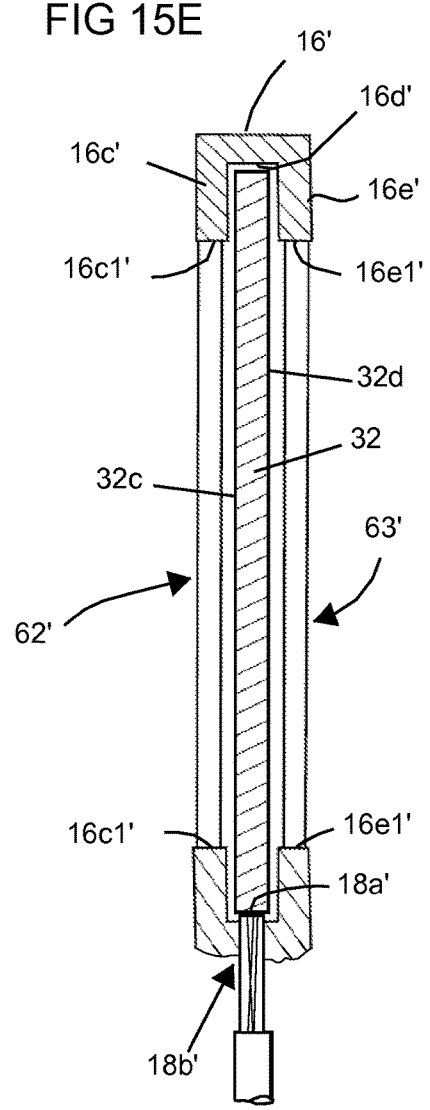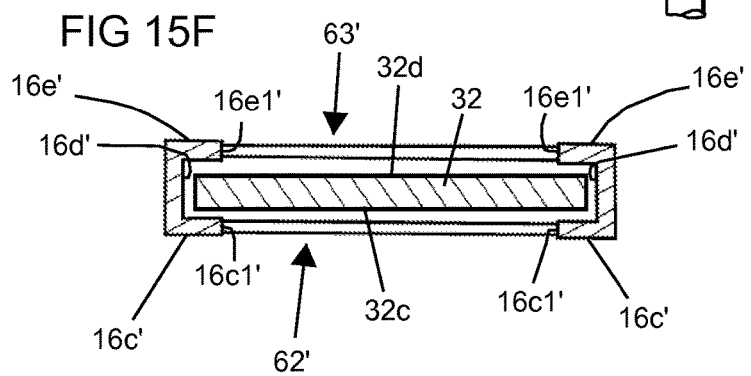

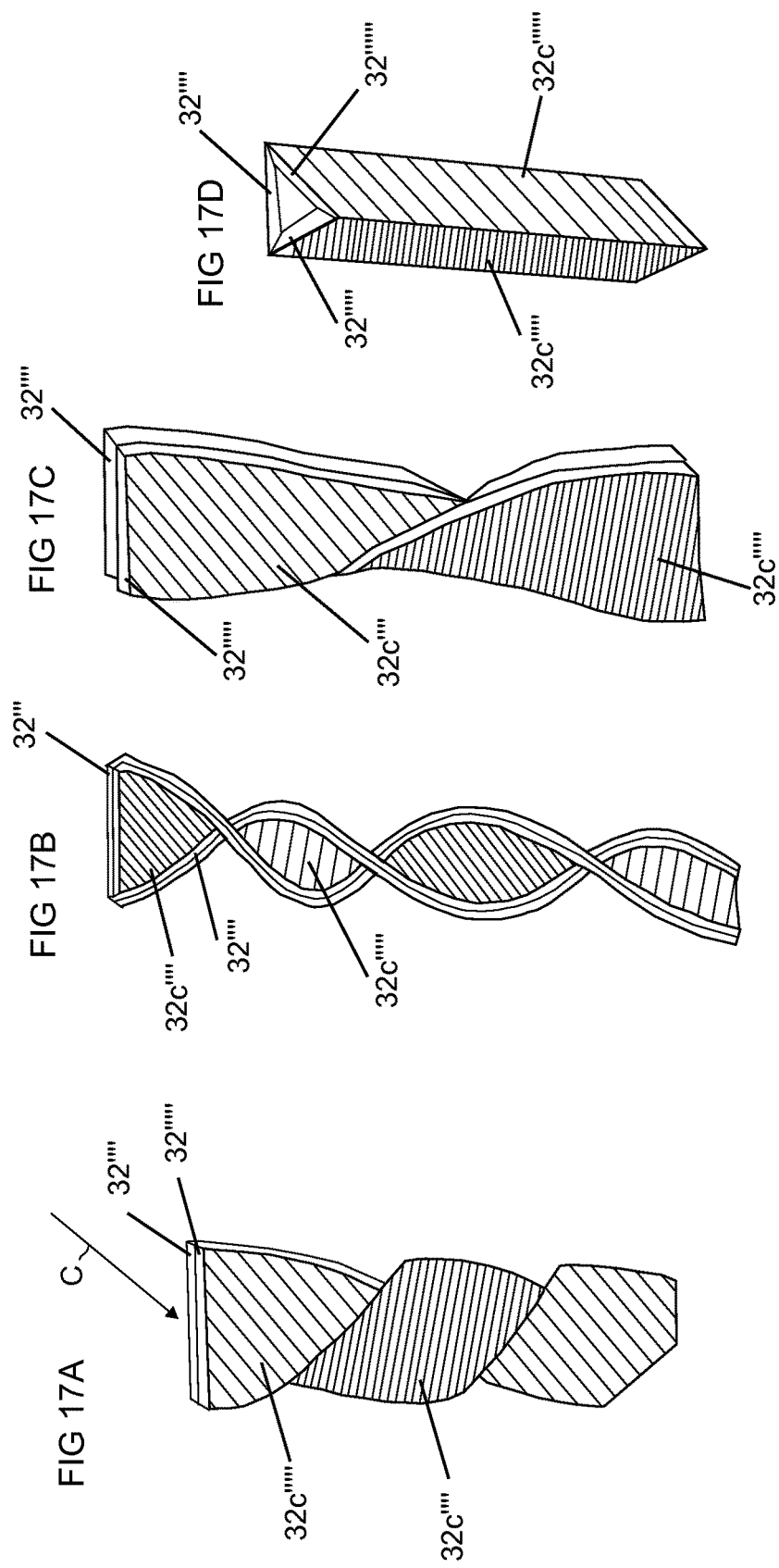

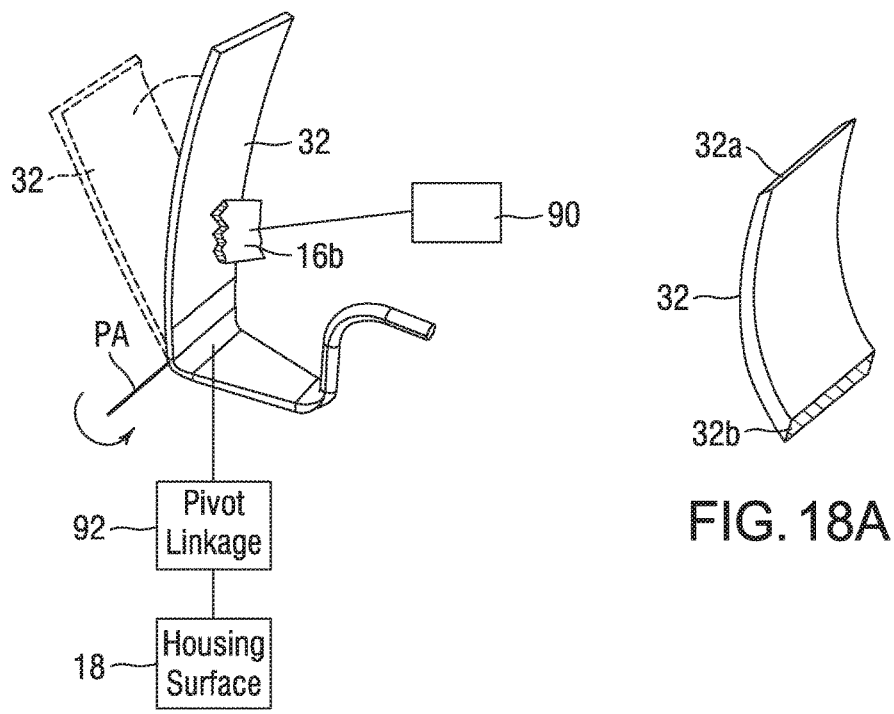
FIG. 18
FIG. 18A
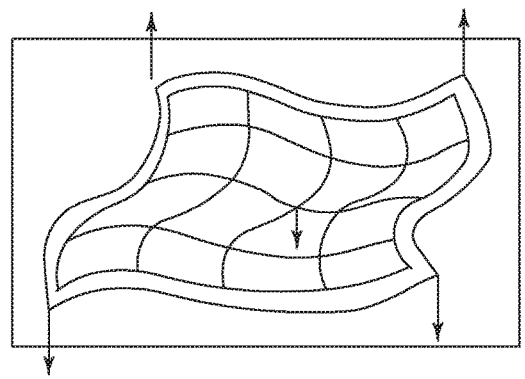
FIG. 19

FIBER OPTIC LIGHTING AND/OR SIGNALING SYSTEM FOR A VEHICLE

BACKGROUND OF THE INVENTION

1. Field of the Invention

This invention relates to lighting and/or signaling devices for a vehicle, and more particularly, a lighting and/or signaling device that utilizes fiber optic fibers.

2. Description of the Related Art

As is well known, vehicles contain numerous types of exterior lighting devices that are necessary to conform to government regulations. For example, lighting devices that perform a stop light function, tail lamp function, head lamp function, daytime running light function, dynamic bending light function, fog light function and the like are common. Whenever possible, it is desirable to provide a device that is adapted and capable of performing a plurality of these functions.

In recent years, for example, tail lights on most existing cars have tended to be power hungry and need various components, such as reflectors. Head lamps are similar in that they require multiple components, such as reflectors, cut off devices and the like. Such devices are typically not easily adapted to the contour or styling of the vehicle on which they are mounted.

To overcome some of these problems, some manufacturers are trying to utilize organic light-emitting diodes (OLED) because they can be formed into two or three-dimensional shapes. Such devices are typically very thin and can be used without reflectors and use a fraction of the power of prior art lighting systems. These OLED light sources are also beneficial because they provide a homogenous light output.

One problem with the OLED light sources is that they can be expensive and have undesirable failure rates.

What is needed, therefore, is a system and method that overcomes one or more of the problems of the prior art.

SUMMARY OF THE INVENTION

It is, therefore, one object of the invention to provide a lighting system that overcomes one or more of the problems of the prior art by utilizing a fiber optic display having a plurality of optical fibers.

Another object of the invention is to provide an improved lighting and/or signaling device and system that overcomes one or more of the problems in the prior art.

Still another object of the invention is to provide an improved lighting and/or signaling device and system that is adaptable to be two or three dimensional to provide a desired lighting characteristic and/or to conform to the styling of the vehicle or to provide a desired lighting effect or aesthetic design.

Yet another object of the invention is to provide a lighting system or method that utilizes a support into which a fiber optic panel having a predetermined form is inserted.

Another object of the invention is to provide a plurality of alternative frame or support designs that can be used with optics or an optical mask to provide a desired lighting effect.

Another object of the invention is to provide an improved lighting and/or signaling device that provides a homogenous light output at a generally lower cost than the devices of the past.

In one aspect, one embodiment of the invention comprises a lighting device for a vehicle comprising an array of optical fibers, at least a portion of the array of optical fibers being arranged in at least one predetermined form, at least one light source for generating light to be transmitted through the array of optical fibers, and at least one support or frame comprising a receiving area adapted to receive the at least one predetermined form, the at least one support or frame being adapted for use on the vehicle to provide a lighting function on the vehicle.

In another aspect, one embodiment of the invention comprises a lighting device for a vehicle comprising a housing, a plurality of support frames located in the housing, and a plurality of fiber optic light panels received in one of the plurality of support frames, each of the plurality of fiber optic light panels comprising a plurality of optical fibers, the plurality of fiber optic panels being adapted to receive light from at least one light source to perform at least one lighting function.

This invention, including all embodiments shown and described herein, could be used alone or together and/or in combination with one or more of the features covered by one or more of the following list of features:

- The lighting device wherein the at least one predetermined form defines at least one panel, the at least one support or frame comprising a receiving area having a shape that generally complements a shape of the predetermined form so that said at least one panel can be received in the at least one support or frame.
- The lighting device wherein the at least one panel is generally planar.
- The lighting device wherein the at least one support or frame defines a frame having a first wall that defines an aperture through which light can pass, the at least one panel comprises a first side and a second side, the first side having a reflective surface for reflecting light towards and through the aperture.
- The lighting device wherein the lighting device comprises at least one of optics or a mask situated in the at least one support or frame in operative relationship with the predetermined form in order to create a desired light pattern.
- The lighting device wherein each of the optic fibers that forms the predetermined form comprises a plurality of reflective facets for reflecting light out of the fiber in a direction that is not parallel with a longitudinal axis of the optic fiber.
- The lighting device wherein the at least one of optics or the mask comprises at least one lens situated in operative relationship with the at least a portion of the array of optical fibers in order to generate the desired light pattern.
- The lighting device wherein the at least one of optics or the mask comprises a mask.
- The lighting device wherein the lighting function is at least one of a headlight, a tail light, a daytime running light, a turn signal or a stop light.
- The lighting device as wherein the at least one predetermined form defines at least one panel that is curved in at least one plate after being received in the at least one support or frame.
- The lighting device wherein the at least one panel comprises a reflective material to produce a desired light pattern.
- The lighting device wherein the at least one panel is flexible.

The lighting device wherein the at least one predetermined form defines at least one panel and comprises a reflective material for reflecting light received from the fiber optics toward and through a surface of the at least one panel to perform the lighting function.

The lighting device wherein each of the optic fibers comprises optics for directing light in a direction that is any direction other than a direction co-axial or parallel to the fiber axis. generally transverse to a longitudinal axis of the fiber.

The lighting device wherein the optics comprise at least one scalloped surface or a plurality of reflective facets having a plurality of reflecting facets.

The lighting device wherein the optic fibers are embedded in a polymer or resin to form the at least one panel.

The lighting device wherein the at least one predetermined form defines at least one panel, the at least one support or frame defining a frame defining an aperture, the frame for receiving and framing the generally predetermined at least one panel.

The lighting device wherein the frame is generally planar.

The lighting device wherein at least part of the at least one support or frame is generally curved in at least one plane.

The lighting device wherein at least part of the at least one support or frame is generally curved in a plurality of planes.

The lighting device wherein the at least one panel emits light through an aperture in the frame to perform a first light function.

The lighting device wherein the at least one panel emits light to perform a second light function that is different from the first light function.

The lighting device wherein the at least one panel comprises a first side and a second side that is generally opposed to the first side, the first side emitting light and the second side being metallized to cause light to pass through the array of optical fibers and through an aperture defined by the frame.

The lighting device wherein the lighting device is mounted in a housing, at least one of the at least one support or frame or the housing comprising indicia that becomes illuminated by the at least one predetermined form when the array of optical fibers are illuminated.

The lighting device wherein the lighting device comprises a driver for driving the at least one panel from a first position to a second position.

The lighting device wherein the array of optical fibers comprise a hinge or pivot axis about which the array of optical fibers are pivoted to enable the driver to drive the at least one panel from the first position to the second position.

The lighting device wherein the lighting device comprises a housing and the at least one support or frame is integrally formed in the housing.

The lighting device wherein the at least one support or frame comprises at least one wall that defines at least one aperture through which light from at least one panel may pass.

The lighting device wherein the at least one support or frame comprises at least one second wall generally opposed to the at least one wall that defines at least one second aperture through which light from the at least one panel may pass.

The lighting device wherein the at least one panel comprises a non-reflective area that defines a mask.

The lighting device wherein the lighting device comprises at least one optical element received in the at least one support or frame and situated between the at least one panel and the at least one aperture.

The lighting device wherein the at least one optical element comprises a mask or lens.

The lighting device wherein the at least one support or frame comprises is stylized into a predetermined configuration.

The lighting device wherein the at least one support or frame comprises indicia that becomes illuminated with the at least one predetermined form is illuminated.

The lighting device wherein the at least one predetermined form defines a generally planar panel, the at least one support or frame comprising a generally elongated body having a slot adapted and dimensioned to receive the generally planar panel.

The lighting device wherein the at least one predetermined form defines a plurality of generally planar panels, the at least one support or frame comprising a plurality of generally elongated bodies each of which has a slot for receiving at least one of the plurality of generally planar panels, respectively.

The lighting device wherein the array of optical fibers each comprise a longitudinal axis and a plurality of reflecting facets for reflecting light from the at least one light source generally transversely or in a direction that is not parallel with the longitudinal axis.

The lighting device wherein each of the array of optical fibers are arranged in a predetermined pattern such that they comprise a plurality of curvatures through which light from the at least one light source may exit.

The lighting device wherein the array of optical fibers are arranged in a woven pattern.

The lighting device wherein the lighting device comprises the at least one support or frame, the array of optical fibers define a plurality of panels adapted to be received and supporting in the at least one support or frame, the plurality of panels cooperating to generate a desired visual effect.

The lighting device wherein the at least one support or frame is configured to support the plurality of panels in different planes.

The lighting device wherein the lighting device comprises a plurality of light sources associated with the plurality of panels, respectively, the plurality of panels being arranged such that the lighting device performs a plurality of different light functions.

The lighting device wherein the plurality of different light functions comprise at least one of a stop light function, a park light function, a daytime running light function, a tail light function or a turn signal function.

The lighting device wherein the plurality of different light functions comprise different colors that include at least one of amber or red.

The lighting device wherein the at least one support or frame comprises a first side defining an open frame and a second side defining a second open frame, the plurality of panels comprising a first panel and a second panel situated back-to-back in the at least one support or frame and adapted to emit light through the first and second open frame, respectively.

The lighting device wherein the at least one predetermined form is at least one panel and the at least one light source that generates a plurality of different colors is under the control of a controller so that the at least one panel emits light of different colors to perform different lighting functions.

The lighting device wherein the lighting device further comprises a light guide, and a coupler to optically coupling the light guide to the at least one predetermined form.

The lighting device wherein the array of optical fibers are arranged in a non-parallel pattern.

The lighting device wherein each of the plurality of fiber optic light panels has at least one light source associated therewith.

The lighting device wherein the at least one light source comprises a single light source and the plurality of fiber optic light panels are illuminated using the single light source.

The lighting device wherein each of the plurality support frames is adapted to receive more than one of the plurality of optic light panels.

The lighting device wherein each of the plurality of support frames comprises a plurality of frame walls that are fastened together to house at least one of the plurality of optic light panels.

The lighting device wherein each of the plurality of fiber optic light panels is generally planar and is formed into a predetermined shape when inserted into one of the plurality of support frames.

The lighting device wherein each of the plurality of fiber optic light panels has a plurality of optical fibers arranged in a predetermined pattern.

The lighting device wherein the plurality of optical fibers are not parallel.

The lighting device wherein the plurality of optical fibers are arranged in a woven pattern.

The lighting device wherein lighting device further comprises at least one of a mask or optics placed in or on one of the plurality of support frames in operative relationship with respect to at least one of the plurality of fiber optic panels.

The lighting device wherein each of the at least one light source emitting light of different colors to perform a plurality of lighting functions.

The lighting device wherein the plurality of lighting functions include at least two of the following functions: a stop light function, a turn signal function, a daytime running light function, a headlamp function or a tail lamp function.

The lighting device wherein the plurality of support frames are arranged in a stepped configuration.

The lighting device wherein the plurality of fiber optic panels each emit light along axes that are parallel.

The lighting device wherein each of the plurality support frames comprises a window or aperture through which light may pass.

The lighting device wherein each of the plurality of support frames comprises a plurality of windows or apertures through which light may pass.

The lighting device wherein each of the plurality of support frames is adapted and dimensioned to cause at least one of the plurality of fiber optic panels to assume a predetermined shape when inserted therein.

The lighting device wherein the predetermined shape is three dimensional and curved in a plurality of planes.

The lighting device wherein the plurality of fiber optic panels comprises at least a first panel and a second panel, at least one of the plurality of support frames comprises a first aperture and a second aperture and being adapted and dimensioned to house both the first panel and the second panel back-to-back so that light from the first panel can be emitting through the first aperture and light from the second panel can be emitted through the second aperture.

The lighting device wherein the at least one lighting function comprises a first light function and a second light function and wherein the light from the first panel is of a first color to perform the first light function and light from the second panel is of a second color to perform the second light function which is different from the first light function.

The lighting device wherein the first light function comprises: a stop light function, a turn signal function, a daytime running light function, a headlamp function or a tail lamp function, the second light function is a different one of the stop light function, turn signal function, daytime running light function, headlamp function or tail lamp function.

The lighting device wherein the lighting device comprises a driver for pivoting at least one of the plurality of support frames between a first position and a second position.

The lighting device wherein the lighting device further comprises a plurality of couplers associated with a plurality of lighting devices, respectively, each of the plurality of couplers comprising a coupling sleeve for receiving a bundle of the plurality of optical fibers, a light guide coupled to the coupling sleeve for guiding light from at least one of the plurality of light sources to the bundle of the plurality of optical fibers.

These and other objects and advantages of the invention will be apparent from the following description, the accompanying drawings and the appended claims.

BRIEF DESCRIPTION OF THE ACCOMPANYING DRAWINGS

FIG. 2 is a front view of the embodiment shown in FIG. 1A without any lens or cover;

FIG. 3 is a fragmentary side view of the embodiment shown in FIG. 1A;

FIG. 4 is a rear view of the embodiment shown in FIG. 1A;

FIG. 5 is a rear view of the embodiment shown in FIG. 1A illustrating a light source mounted on a light source support embodied in the housing;

FIG. 6 is a plan view of the headlamp assembly of FIG. 1B showing the light source in mounting relationship to the light source support;

FIG. 13 is a view illustrating the procedure for inserting an optical panel in a support;

FIG. 14A is another view showing details of the optical panel for one of the plurality of lighting devices;

FIG. 14B is a view taken along the line 14B-14B in FIG. 14A;

FIG. 15A-15M are views illustrating various features of various embodiments of the support;

FIGS. 17A-17D illustrate various two and three dimensional shapes that can be realized utilizing the flexible optical panels described;

FIG. 18 is a view of another embodiment illustrating a pivotal support and/or panel;

FIG. 18A is a fragmentary view showing the panel flexed at both ends;

FIG. 19 is a view of a three dimensional shape achievable with the embodiments described herein.

DETAILED DESCRIPTION OF THE PREFERRED EMBODIMENTS

Figure 1A:
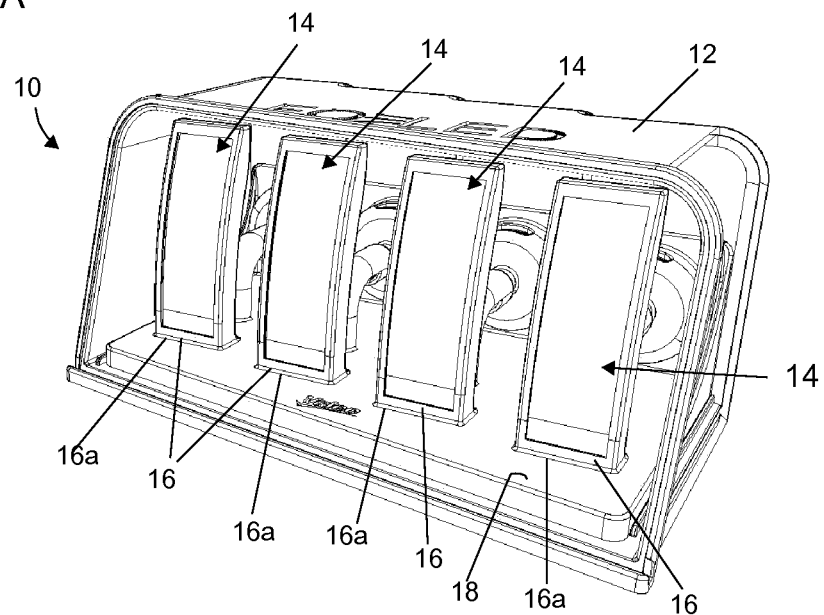
FIG. 1A is a perspective view of a lighting and/or signaling device in accordance with one embodiment of the invention.

Referring now to FIGS. 1-19, a lighting system 10 is shown. In the illustration being described, the lighting system 10 is adapted to be used on a vehicle V (FIG. 1C) to provide at least one or a plurality of lighting functions. In a preferred embodiment, the lighting system 10 provides an exterior lighting function, such as a stop light, a side light function, a tail light, a head light, a daytime running light (DRL) and the like.

The lighting system 10 comprises a housing 12 that houses at least one or a plurality of lighting devices 14. In the illustration being described, each of the at least one or plurality of lighting devices 14 comprises at least one or a plurality of supports or frames 16 having an end 16a that is integrally formed in a surface 18 of the housing 12. In one embodiment, the plurality of supports or frames 16 are arranged in a stepped configuration as shown in FIG. 6 and lie in planes that are generally parallel. They emit light along optical axes that are parallel. However, they could lie in a common plane or they could lie in different planes so that they emit light along optical axes that are not parallel. Details and features of the support or frame 16 and the at least one light source 20 will be described later herein.

Figure 10:
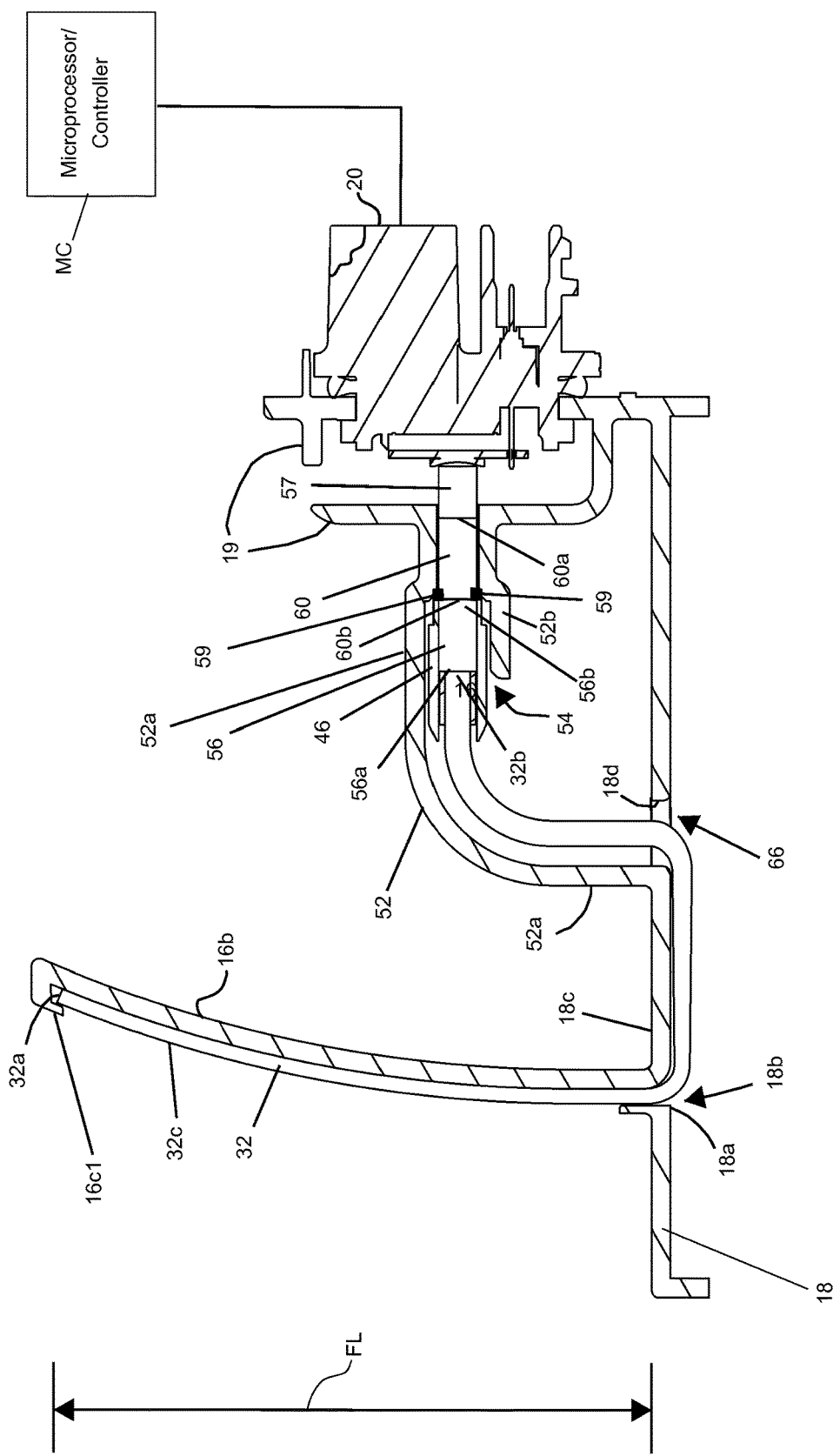
FIG. 10 is a sectional view taken along the line 10-10 in FIG. 7.
Figure 11A:
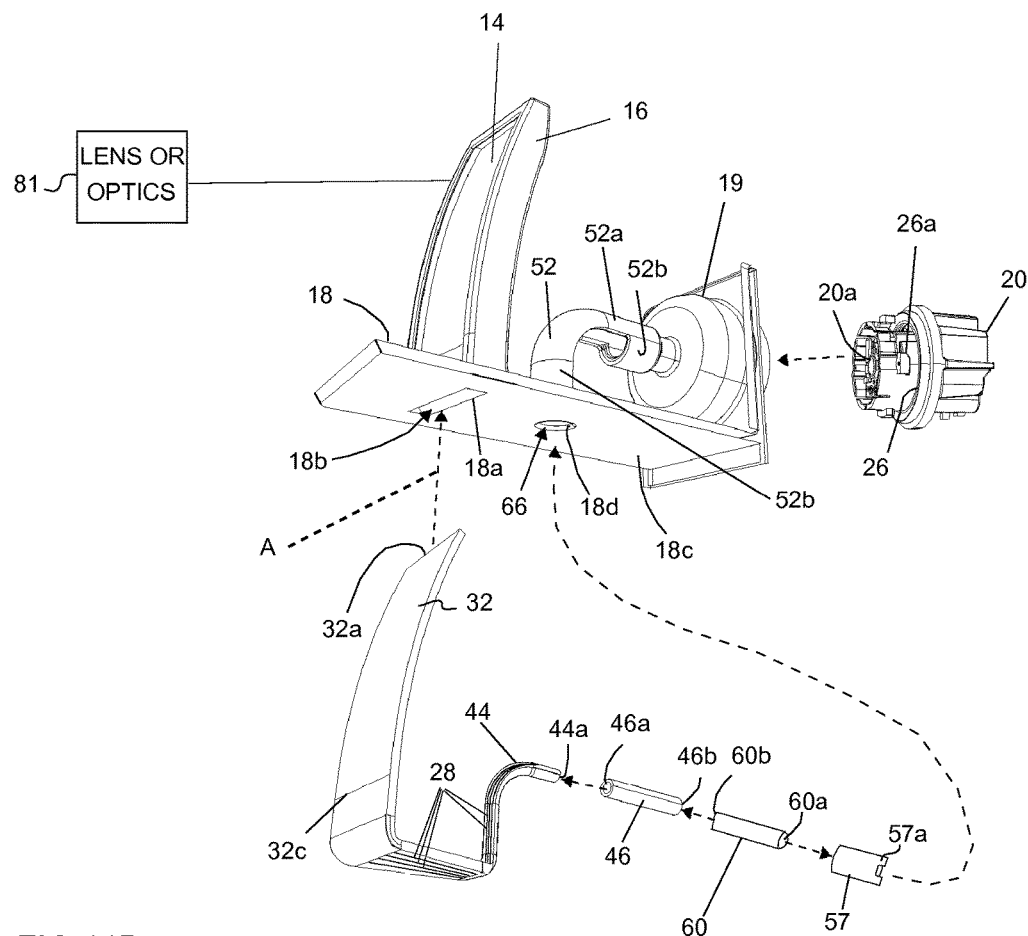
FIGS. 11A-11E illustrate various features of one of the plurality of lighting devices.
Figure 11B:
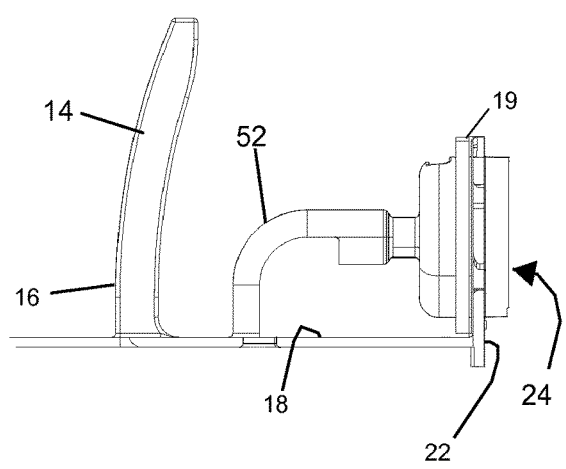
Figure 11C:
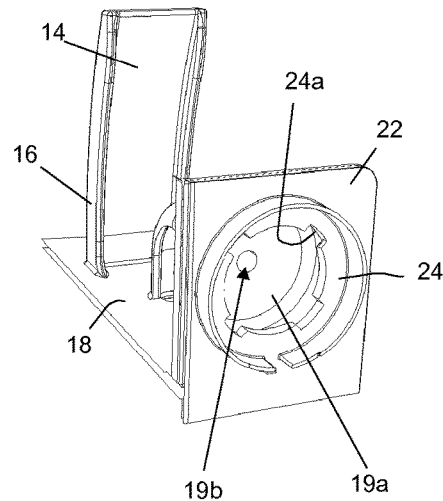

As best illustrated in FIGS. 4 and 11C, the housing 12 comprises a rear wall 22 comprising a plurality of integrally molded light source supports 19 (FIG. 11A). At least one light source 20 (FIGS. 5, 6, 10 and 14A) having a light-emitting device 20a is mounted to the light source support 19. In this regard, light source support 19 comprises a female connector 24 (FIG. 11C) adapted to receive a mating male connector 26 (FIG. 11A) of the at least one light source 20. The male connector 26 has male projections 26a that are received in the female apertures 24a (FIG. 11C) of the female connector 24 that are coupled together using a conventional bayonet-type connection. In the illustration being described, the at least one light source 20 comprises the light-emitting device 20a (FIG. 11A) which may comprise at least one or a plurality of solid state light sources such as light-emitting diodes (LEDs) or a laser diode. The at least one or a plurality of light-emitting diodes (LEDs) can be the same or different colors as explained below.

It should be understood that the at least one light source 20 could be any high-power light source or LED. For example, a conventional printed circuit board (PCB) having one or more LEDs or solid state LEDs could be used with the plurality of optical fibers 28.

Figure 13A:
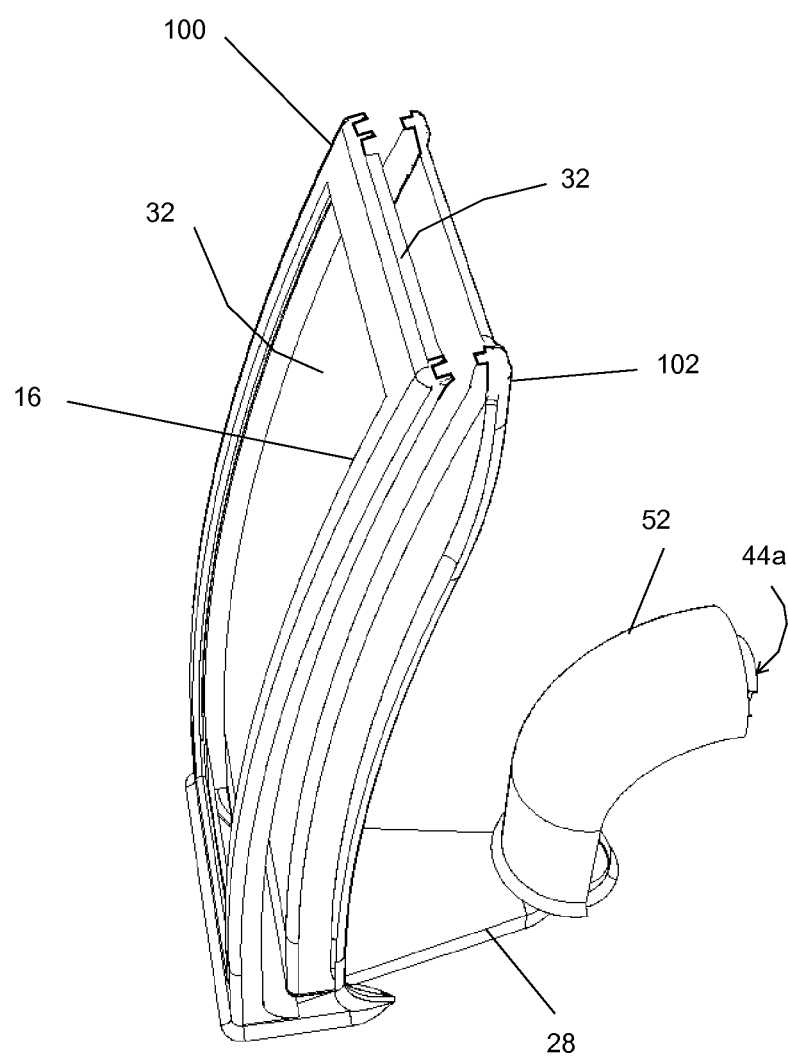
FIG. 13A shows a support or frame having a first wall and a second wall.
Figure 14C:
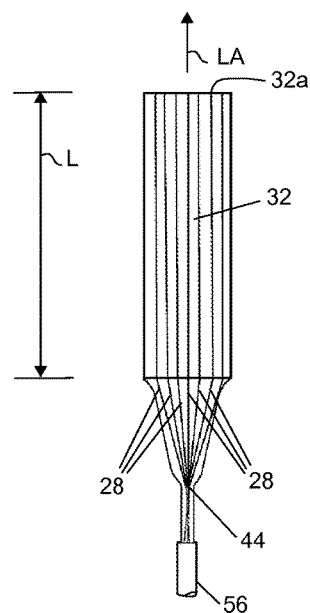
FIGS. 14C-14E illustrate various features of the fiber optic panel and the fibers therein.
Figure 14D:
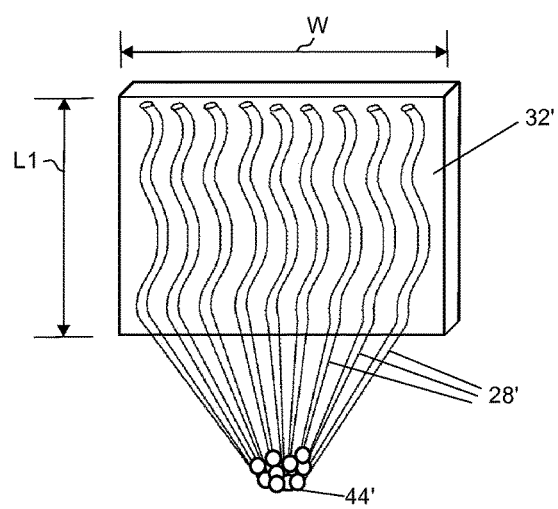
Figure 14E:
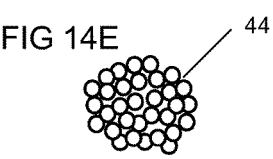
Figure 14F:
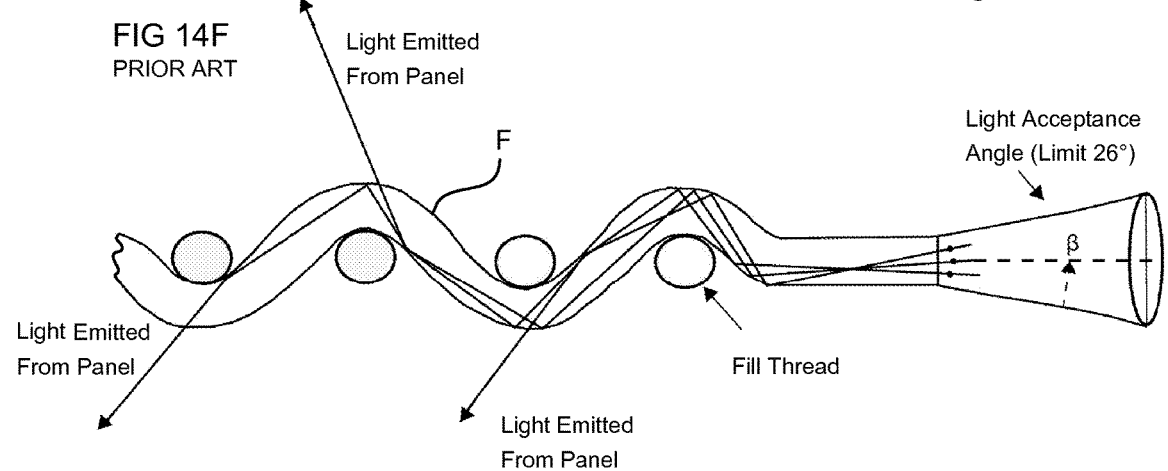
FIG. 14F is a view of a prior art woven optical fiber.
Figure 14H:
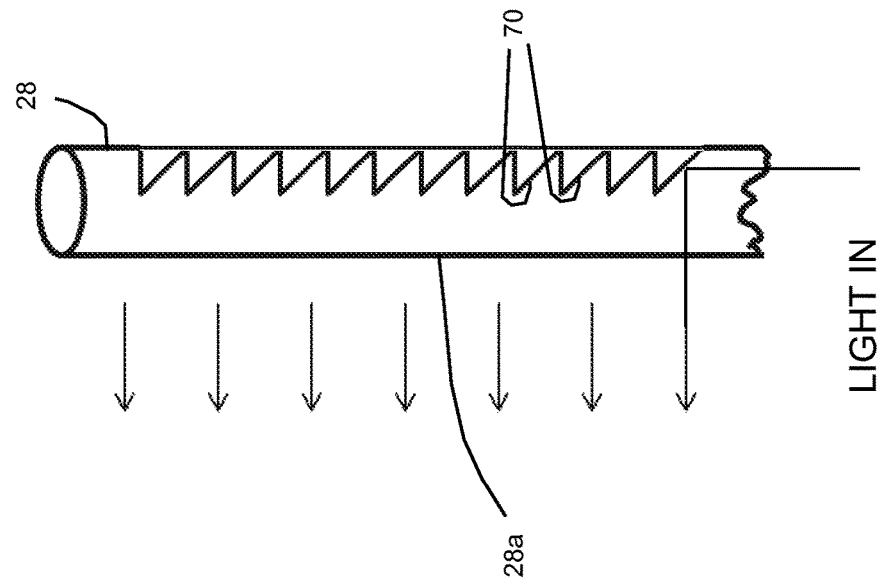
FIG. 14H is a view of a fiber with a plurality of reflective facets.
Figure 14G:
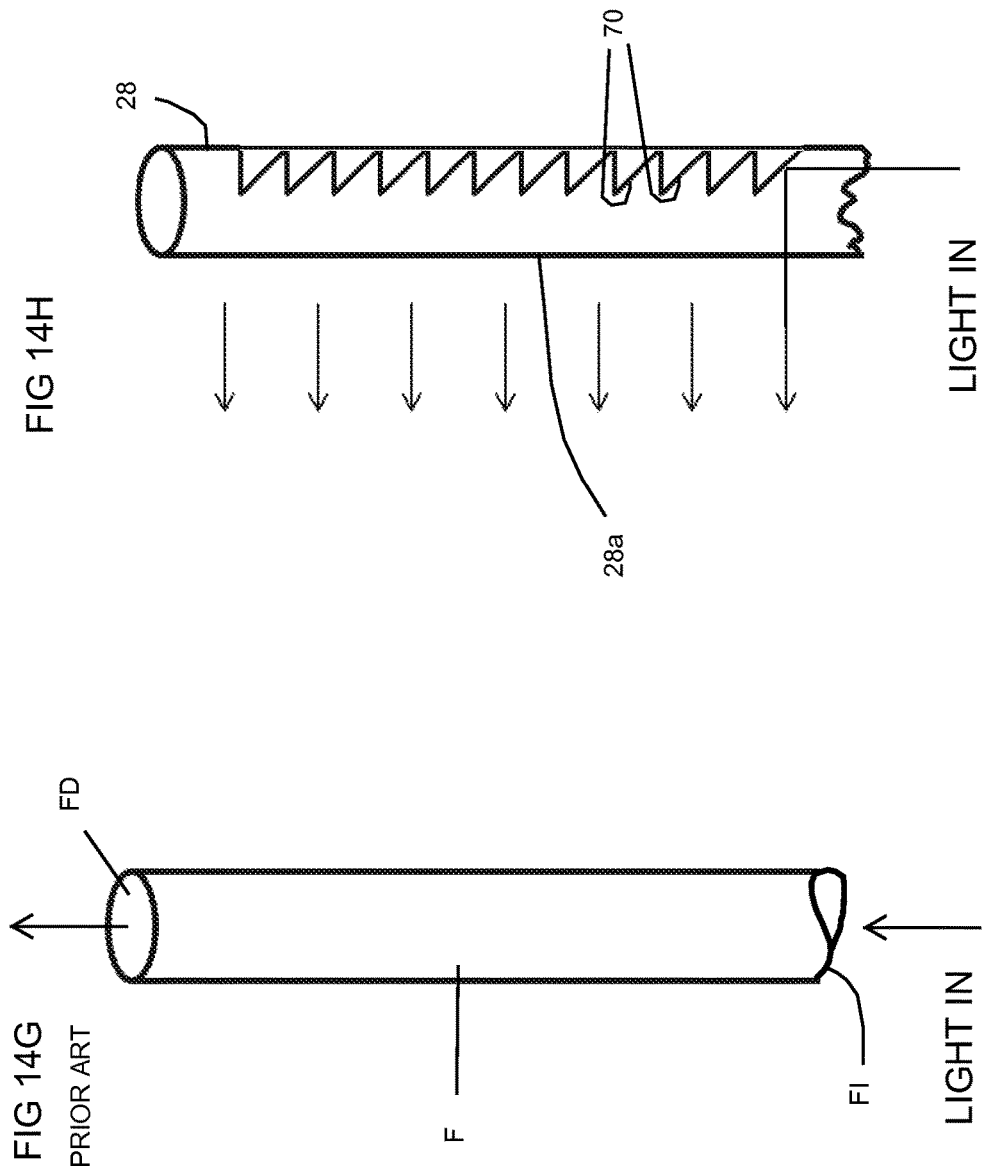
FIG. 14G is a view of a fiber optic fiber that utilizes total internal reflection (TIR)

Referring now to FIGS. 13-14G, note that each of the plurality of lighting devices 14 comprises a plurality of optical fibers 28 that are arranged in an array in at least one predetermined form. In the illustration being described, the at least one predetermined form defines a generally planar and generally rectangular panel 32, as best illustrated in FIGS. 13 and 14A-14D. In the illustration being described, note that the plurality of optical fibers 28 extend along a length L (FIG. 14C) of the panel 32. It should be understood that the panel 32 is pliable and flexible and is adapted to be fit and received in the support or frame 16 as described herein. In this regard and as best illustrated in FIG. 11A, note that the surface 18 of the housing 12 comprises a wall 18a that defines a slot 18b into which a first end 32a of the panel 32 is inserted. The support or frame 16 comprises a frame length FL that is generally arcuate or curved along its longitudinal length as illustrated in FIG. 10. When the panel 32 is inserted into the support or frame 16, it assumes and conforms to the general shape of the support or frame 16 as illustrated.

It should be appreciated that the support or frame 16 may be a multi-piece construction. For example, FIG. 13A shows a support or frame 16 having a frame 100 having a first wall 102 and a second wall 104. The first wall 102 and second wall 104 are adapted to be press fit or snap fitted together to capture at least one panel 32 and any optics or masks desired. It should be understood that the first wall 102 and second wall 104 may be fastened together by other means or conventional fasteners, such as a hot weld, a screw fastener or the like.

In the illustration being described, the plurality of optical fibers 28 are conventionally embedded in a substrate 40 (FIG. 14B), which could be a polymer, resin or other conventional substrate. Note that portions 28b of the plurality of optical fibers 28 extend out of the substrate 40 and panel 32 and are gathered and combined in a bundle 44 to define a light-receiving end or input end 44a (FIGS. 10, 11A and 14A). The input end 44a becomes operatively positioned in a first end 46a of a coupler or sleeve 46 as illustrated in FIGS. 10, 11A and 14A. Although not shown, the bundle 44 may comprise a wrap, sleeve, adhesive, tape, resin or the like (not shown) to facilitate holding the fibers 28 in the bundled position illustrated in FIG. 14E.

The panel 32 comprises a light pipe or light guide 60 that has a first end 60a coupled to and received in a hollow plug 57. The plug 57 has male projections 57a (FIG. 11A) that become coupled to the at least one light source 20. A second end 60b of the light guide 60 is received in the sleeve or coupler 46 at a second end 46b. As mentioned earlier, the first end 46a of the sleeve or coupler 46 receives the end 44a of the bundle 44. During assembly, the plug 57 is received in an aperture 24*d* (FIG. 4) defined by a wall 24*c* so that it can be situated in close proximity to the light-emitting device 20*a* of the at least one light source 20. In one embodiment, the male projections 57*a* of the plug 57 may be received in mating female apertures (not shown) in the at least one light source 20. Once the parts are assembled and the plug 57 is coupled to the light source 20, it causes the first end 60*a* of the light guide 60 to become aligned with an aperture 19*b* (FIG. 11C) in the interior wall 19*a* so that it can receive light from the at least one light source 20. In the illustration, the light guide 60 is an integral one-piece construction made of silicon or plastic and provides an optical coupling between the fiber ends 44*a* and the light-emitting device 20*a* of the at least one light source 20.

It should be understood that while the lighting device 10 has been shown using the light guide 60, this part could be eliminated and other arrangements or fixtures could be used to hold the fibers 28 in operative relationship with the light-emitting device 20*a* so that the fibers 28 can receive light from the at least one light source 20. For example, the fiber ends 44*a* could be mechanically placed directly against the light-emitting device 20*a* of the at least one light source 20.

As shown in FIGS. 10 and 11A, the surface 18 comprises an integral conduit 52 having a first wall 52*a* and a generally opposing second wall 52*b* that cooperate to define a passageway or a receiving area 54. The surface 18 comprises a generally cylindrical wall 18*d* that defines an aperture 66 that is in communication with the first end 52*a* of the conduit 52 and the receiving area 54. Note that the second wall 52*b* is truncated and open at the aperture 66. The second wall 52*b* is partially truncated so that the conduit 52 is open on a lower side (as viewed in FIG. 10) thereof in order to facilitate inserting the plug 57, the coupler 46 and the bundle 44 into the receiving area 54 and guiding the plug 57 into the receiving area 54 to the light source support 19. As best illustrated in FIG. 10 and as mentioned earlier, it should be appreciated that once the at least one light source 20 and plug 57 are coupled to the light source support 19 of the housing 12, the light-emitting device 20*a* (FIG. 11A) becomes operatively aligned and positioned with respect to end 60*a* of the light guide 60.

As best illustrated in FIGS. 10, 11A, 13 and 14A-14D and as mentioned earlier herein, the panel 32 is inserted in the direction of arrow A (FIG. 13) and into the slot 18*b* until it is fully received in the frame or support 16 as illustrated in FIG. 13. As illustrated in FIG. 14B, note that the panel 32 comprises a first side 32*c* through which light from the plurality of optical fibers 28 is emitted. The light may also be emitted on a second side 32*d* of the panel 32. Alternatively, the second side 32*d* may be partially or fully coated or covered with a reflective material in order to reflect light through the first side 32*c* and out of the support or frame 16 in order to provide or perform the first lighting function. The support or frame 16 is sized and adapted such that the inserted panel 32 is held in place by a friction fit or press fit.

Once the panel 32 is received in the support or frame 16, the plug 57, coupler 56 and bundle 44 assemblage may be received in the receiving area 54 and coupled to the light source support 19 as mentioned earlier. In the illustration being described, the conduit 52 may comprise at least one O-ring or fastener 59 (FIG. 10) that facilitates retaining the light guide 60 in a fixed position relative to the at least one light source 20.

Again, it should be understood that in FIG. 14A, the male plug 57 mates with the interior wall 19*a* (FIG. 11C) on the light source support 19. After mating and being fixed to the light source support 19, the coupling or plug 57 causes the light-emitting device 20*a* of the at least one light source 20 to be generally aligned with the end 60*a* of the light guide 60 so that when the light-emitting device 20*a* is energized, the light travels through the light guide 60 and into the end 44*a* of the bundle 44 and through the fibers 28, thereby illuminating the panel 32.

It should be understood that while the panel 32 is shown and illustrated as being generally elongated and rectangular as illustrated in FIGS. 14A-14C, the predetermined form of the plurality of optical fibers 28 could be arranged or assume other arrangements and forms. For example, FIG. 14D illustrates a panel 32' having a width W that generally exceeds a length L as shown. In the illustration being described, the panel 32, 32' could comprise any predetermined form, but it is preferred that the panel 32, 32' be adapted to generally complement the shape and size of the support or frame 16 in which it is received. It should be appreciated that the plurality of optical fibers 28' are arranged in a predetermined pattern which in the embodiment of FIGS. 14A-14C illustrates the plurality of optical fibers 28 arranged in a generally parallel relationship with respect to each other and extending along or generally parallel to a longitudinal axis LA (FIG. 14C) of the panel 32. FIG. 14D illustrates an embodiment wherein the plurality of optical fibers 28 are arranged in a serpentine pattern in a panel 32.

Thus, it should be understood that the plurality of optical fibers 28 may assume similar or different positions (e.g., parallel, non-parallel, curved, arcuate or serpentine). For example, some of the plurality of optical fibers 28 may be straight while others are not. Although the plurality of optical fibers 28 are shown extending along the length L and L1 of the panels 32, 32', respectively, some or all of the plurality of optical fibers 28 could extend less than the entire length. The plurality of optical fibers 28 could be longer than the length L and L1 and arranged, for example, in a circular, elliptical, polygonal or other pattern within the panel 32. Also, the plurality of optical fibers 28 may have different sizes or dimensions, such as different diameters. Thus, the plurality of optical fibers 28 can be different shapes, dimensions and sizes and are adapted and arranged in the predetermined form in response to the light pattern or lighting function desired.

As is conventionally known, a conventional optic fiber F (FIG. 14G) generally transmits light through total internal reflection (TIR) from one end of the fiber to a second end. FIG. 14G illustrates a prior art fiber F having an input end FI that receives light and through total internal reflection (TIR). It has been found that by wrapping or curving the fiber, such as in the pattern shown in FIG. 14F, the light may exit the fiber F as illustrated. When the fibers are arranged in an array in the predetermined form, such as the forms illustrated in FIGS. 14C and 14D, the emitted light from the panel 32 will illuminate in a direction that is generally not parallel with a longitudinal axis of the fiber. Thus, by causing the at least one or a plurality of the optical fibers 28 to be curved along their longitudinal axis of the fiber can enable the fiber to emit light or illuminate into a predetermined or desired direction, such as the direction indicated by arrow B in FIG. 14B.

Figure 12:
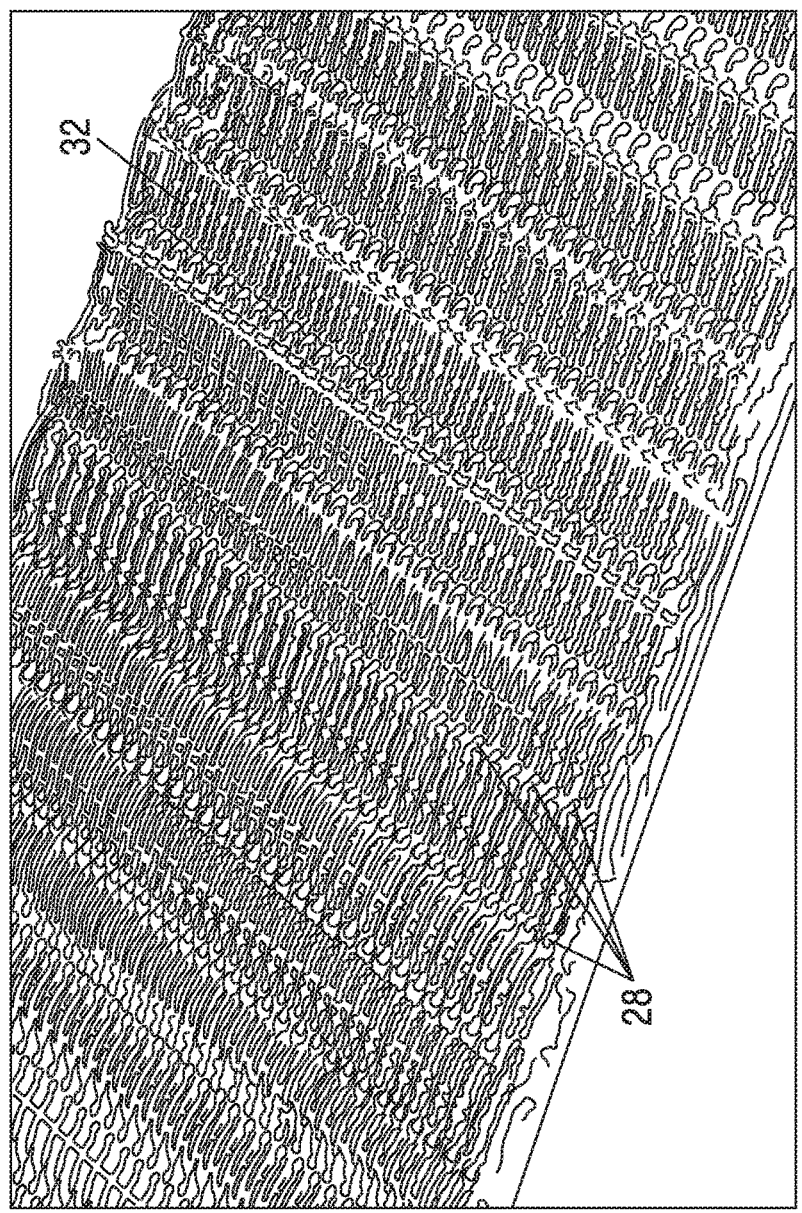
FIG. 12 is a view of a woven pattern of optical fibers.
Figure 14I:
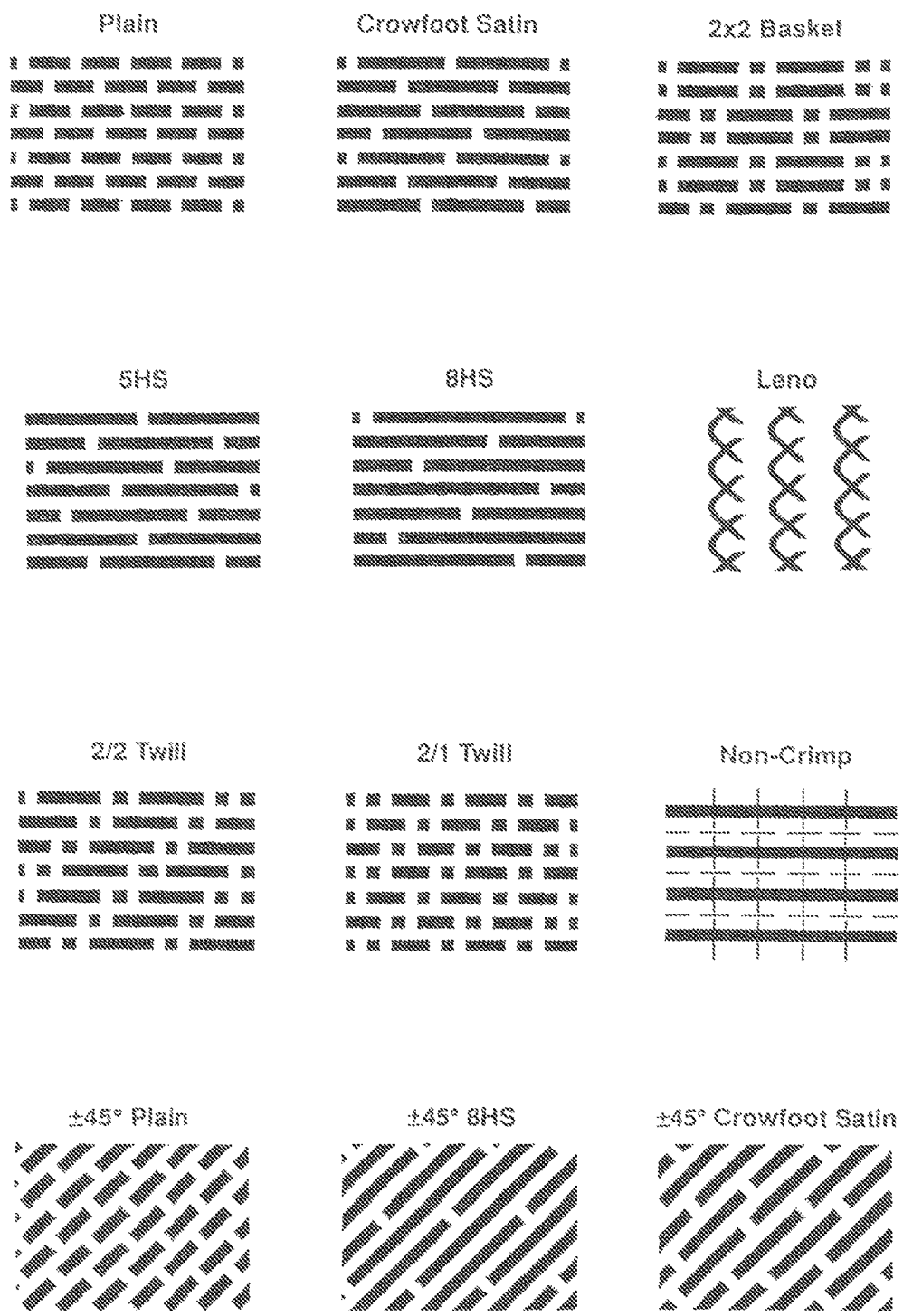
FIG. 14I is a view of a plurality of possible woven patterns that could be used with the optical fibers.

It has been found to be desirable to capitalize on this feature by providing a woven pattern of the plurality of optical fibers 28 in order to generate a predetermined lighting function or result. FIG. 12 illustrates a panel 32 having a woven pattern. FIG. 14F illustrates a prior art pattern of fibers wherein warp and fill fibers are woven as shown. FIG. 14I illustrates a variety of weave patterns that may be selected to perform a predetermined function and these patterns include: plain, crowfoot satin, 2×2 basket, 5HS, 8HS, leno, 2/2 twill, 2/1 twill, non-crimp, ±45° plain, ±45° 8HS and ±45° crowfoot satin. Other patterns may be used as well depending on the lighting effect desired.

By arranging the plurality of optical fibers 28 in the predetermined array and into the predetermined form within the panels 32, 32', different patterns of light may be provided, such as a pattern that illustrates a plurality of rows of fibers 28 that, when lit, have an intensity that is generally greater than the intensity of light in the areas between the fibers 28. Of course, fibers 28 woven in an opposite direction, for example, would also provide areas of light intensity that is generally greater than areas between the fibers 28. Thus, it should be understood that the fibers 28 may be woven into a predetermined pattern to produce a desired lighting function, effect or characteristic.

In the illustration being described and to facilitate the light being emitted generally transverse to a longitudinal axis of the fiber 28, the fiber 28 may be modified to comprise optics. In the illustration being described, the optics may comprise a plurality of facets or reflective surfaces 70 (FIG. 14H) which facilitate directing or reflecting the light through an exit face or surface 28a of the fiber 28. Altering the fibers 28 to direct light in the desired direction can be achieved through a variety of methods including, but not limited to: providing the plurality of facets or reflective surfaces 70 as mentioned, laser ablating a surface of the fiber 28, mechanical abrasion of a surface of each fiber 28, etcetera. It should be understood that the plurality of facets or reflective surfaces 70 may be identical in size or different in size (for example, size, depth, shape, etcetera) and that they may be arranged in a specific pattern that would not require the need of the support or frame 16.

Features of various embodiments of the support or frame 16 will now be described. As mentioned earlier herein, the lighting device 14 comprises the support or frame 16 (FIGS. 1A and 13) which, as mentioned earlier herein, receives the panel 32. The support or frame 16 comprises a back or rear wall 16b (FIGS. 11D-11E) and a wall 16c that generally opposes the back or rear wall 16b as shown to provide a frame for the panel 32. Thus, the wall 16c frames the panel 32. An interior edge 16c1 of the wall 16c defines a window or an aperture 62 through which light from the first side 32c of the panel 32 may be emitted. As mentioned earlier herein relative to FIG. 13, the panel 32 is inserted into the support or frame 16 such that the operative, first or light emitting side 32c is exposed.

Figure 11D:
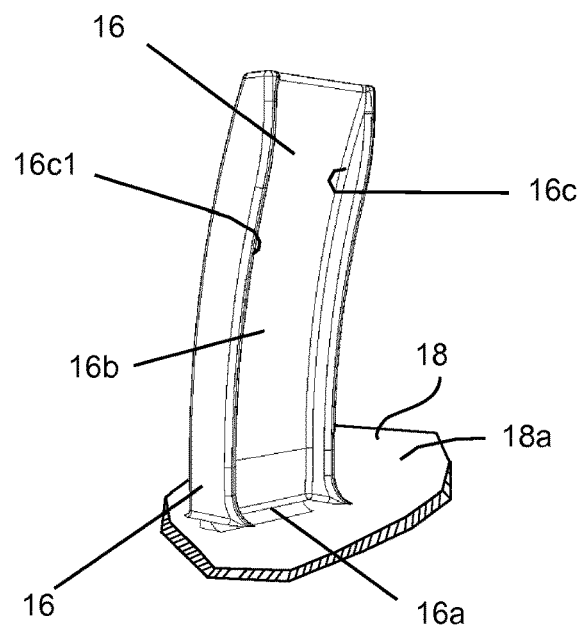
Figure 11E:
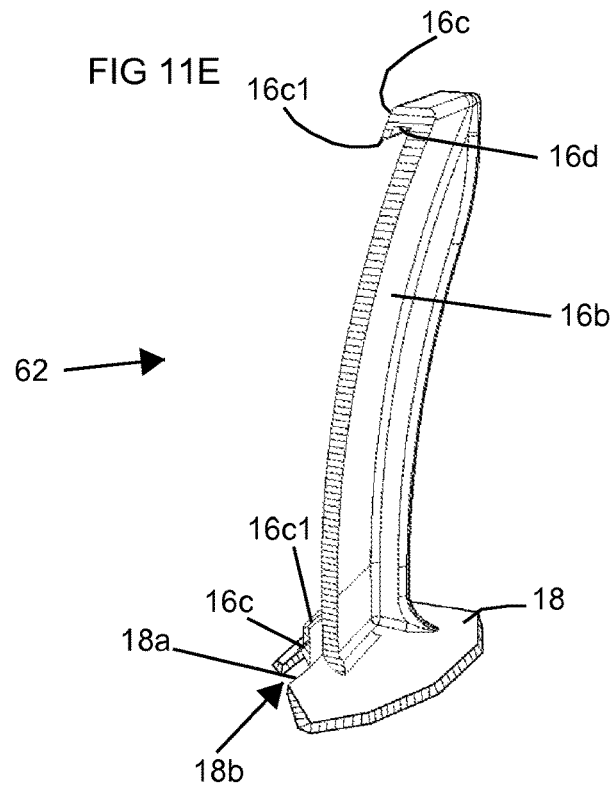
Figure 15G:
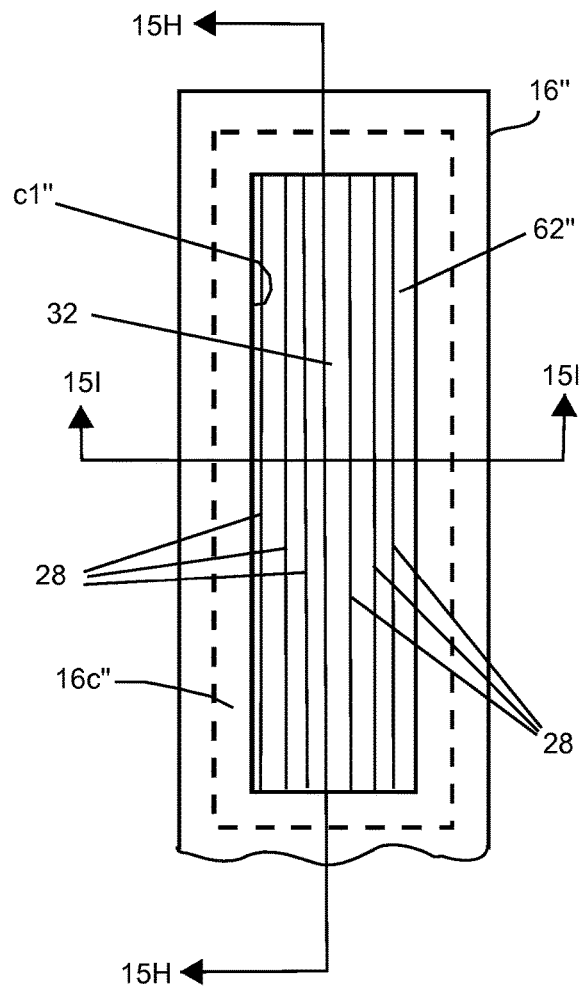

FIGS. 11A-11E and 15A-15I illustrate various fragmentary and sectional views showing features of various embodiments of the support or frame 16. For ease of illustration, common part numbers in FIGS. 15A-15I are identified with the same part numbers, except that one or more prime marks ("'") have been added to the parts for the different embodiments. In FIGS. 1A, 11D-11E, note that the support or frame 16 is generally curved as mentioned earlier. In contrast, FIGS. 15A-15C are simplified views of the panel 32 without any curvature. A joining wall 16d joins the wall 16c to the rear wall 16b. In the embodiments of FIGS. 1A and 15A-15C, the rear wall 16b is solid and covers the side 32d of the panel 32.

In the illustration being described, the support or frame 16 is made of a transparent material which may or may not comprise optics. It has been found that by situating the panel 32 in a transparent material, light from the panel 32 may be emitted through the support or frame 16, such as through the aperture 62 and the rear wall 16b. The rear wall 16b can also comprise a semi-transparent material. This has been found to provide an advantageous feature in that it provides a secondary lighting function. In this example, the panel 32 illuminates at least a portion of the housing 12 which comprises indicia 75 (FIGS. 1B and 6), such as the "FO LED" indicia (FIG. 1B) or any other indicia in the form of a logo, trademark, alpha-numeric characters, a pattern, letters or numbers, the indicia 75 may be illuminated. This is especially true if the indicia 75 are transparent while other portions of the housing 12 are opaque.

In another embodiment illustrated in FIGS. 15J-15M and 16A-16D, it should be appreciated that the support or frame 16 is adapted to receive at least one or a plurality of masks 80-86 (FIGS. 16A-16D) that may be placed in the support or frame 16, for example, between the side 32c of the panel 32 and the aperture 62. In the illustration being described, the masks 80-86 are made of any polymer or plastic sufficient for an automotive environment, such as PMMA, PC (thin films); metal; carbon fiber; paint; or any suitable opaque material. The masks 80-86 (FIGS. 16A-16D) comprise interior walls 80a-86a, respectively, that define apertures 80b-86b, respectively, that provide a predetermined shape or mask pattern. The apertures 80b-86b comprise a common or different shape and that define apertures 80b-86b through which light may pass. In the other areas of the masks 80-86, such as the areas 80c, 82c, 84c and 86c (indicated by a grey shading in FIGS. 16A-16D, respectively) are opaque areas and occlude or block the light emitted by the panel 32. It should be understood that the various masks 80-86 may comprise apertures or shapes that are the same or different and they could provide a predetermined function, such as providing stylized lighting, illuminating of alpha-numeric characters and the like.

In the illustration being described, at least one or a plurality of masks 80-86 are inserted into the slot 18b in opposed relationship with the surface 32c as best illustrated in FIGS. 15J-15M.

It should also be understood that the masks 80-86 may be integrally formed or molded with the support or frame 16. FIG. 15M illustrates another embodiment where the mask 80 is molded (e.g., using conventional two-shot molding techniques) into the frame 16.

FIGS. 15E-15F show another embodiment wherein the rear wall 16b may provide a second frame. Note the back wall 16b' has a second lip or wall 16e' having an interior rear edge 16e1' that defines a second window or second aperture 63' in the support or frame 16' as shown. In this embodiment, light from the panel 32 may be emitted through the aperture 62' as well as the second aperture 63'.

Figure 15H:
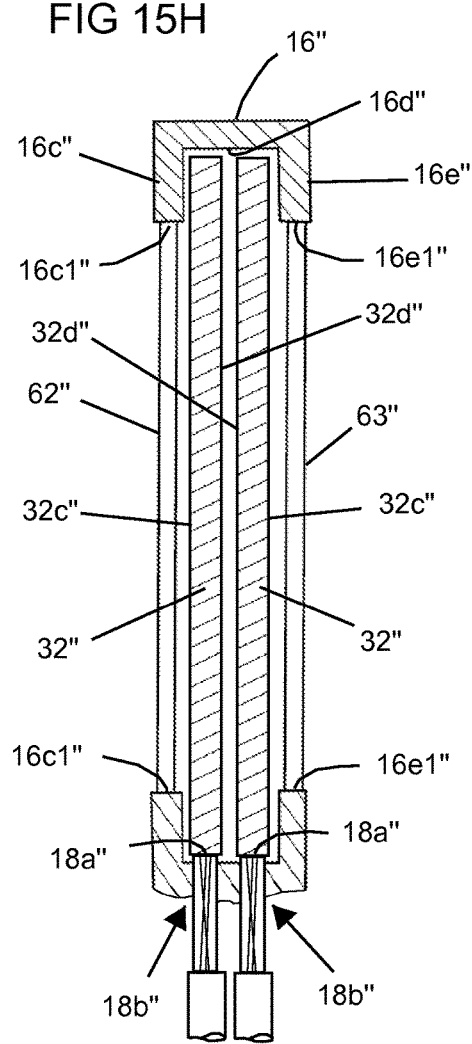
Figure 15I:
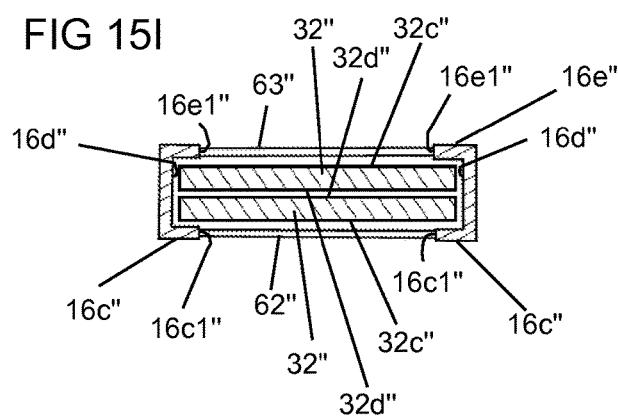
Figure 15J:
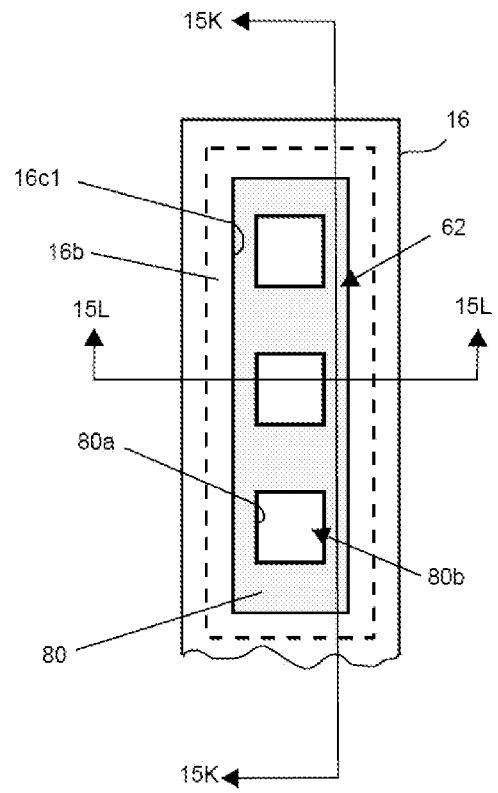
Figure 15K:
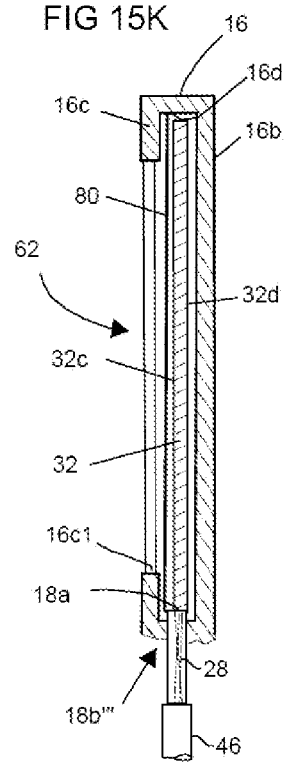
Figure 15L:
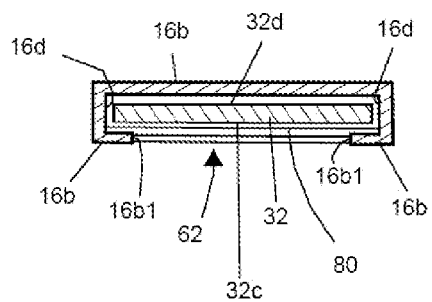
Figure 15M:
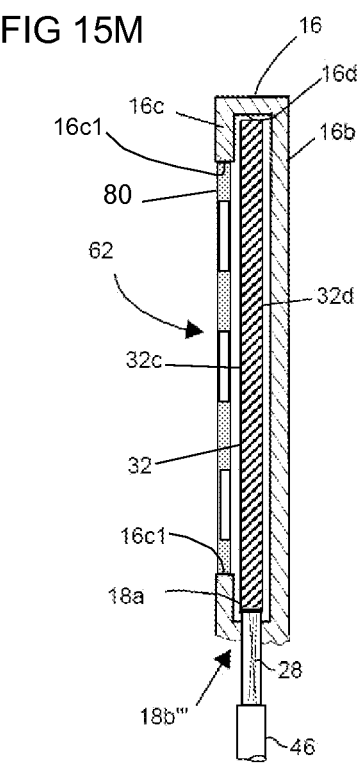
Figure 16A:
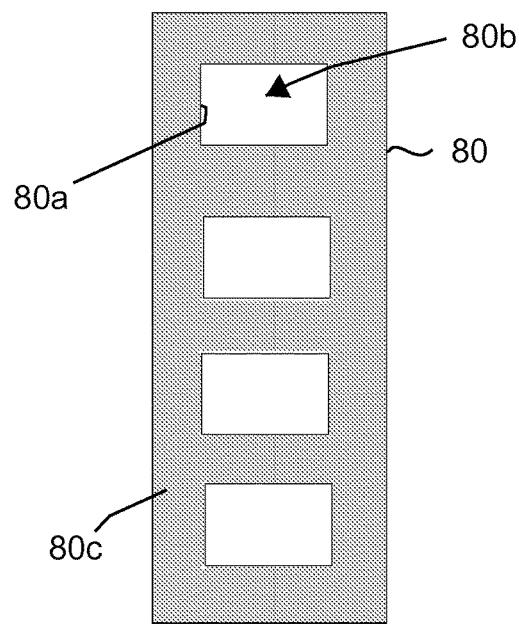
FIGS. 16A-16D illustrate various exemplary masks that could be used with the embodiments described herein.
Figure 16B:
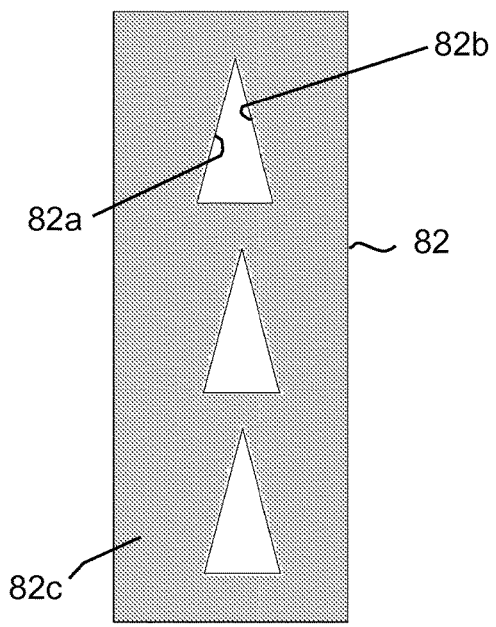
Figure 16C:
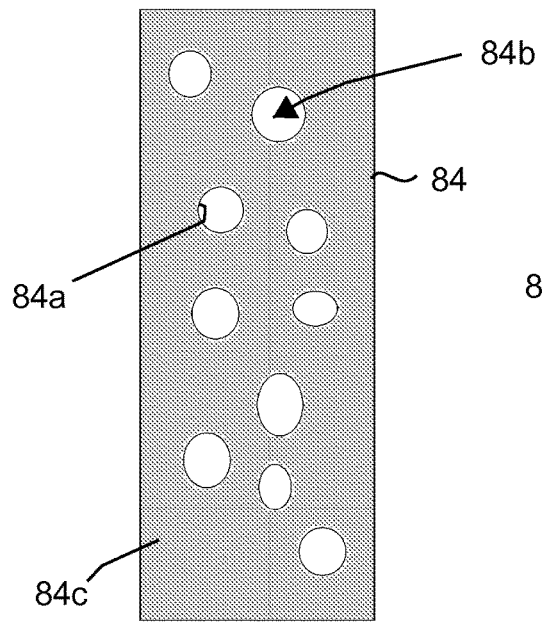
Figure 16D:
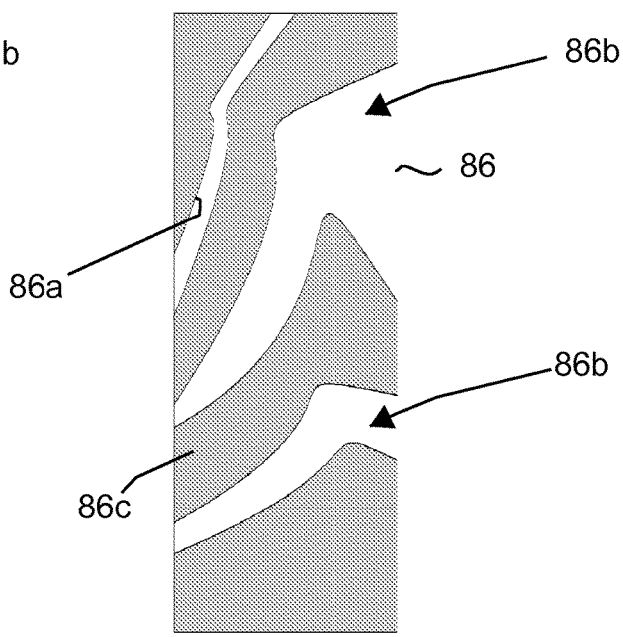

It should also be appreciated that one or more panels 32 may be received together and housed in the support, such as the support or frame 16, 16' and 16", and this is illustrated in FIGS. 15G-15I. In this embodiment, a plurality of panels 32" are situated back-to-back so that light from their respective sides 32c" is emitted through the apertures 62" and 63". As mentioned earlier, one or more masks 80-86 (FIGS. 16A-16D) may also be used with the open frame embodiments of FIGS. 15D-15I, either alone with a single panel 32" or with both panels 32". It should also be understood that the masks 80-86 may be the same or different.

As illustrated in FIG. 10, the panels 32 associated with each of the masks 80-86 are under the control of a microprocessor or controller MC which controls the operation of each of the plurality of light sources 20. It should also be appreciated that the microprocessor or controller MC may energize the light sources associated with the different panels 32 at the same time or independently of each other. It should also be understood that the at least one light source 20 may comprise a plurality of light-emitting devices 20a that are of the same color or of different colors. For example, the at least one light source 20 may be adapted to emit an amber color to perform a turn signal function, a red color to perform a stop light function or even a white color to perform another lighting function. It should also be understood that the at least one light source 20 may be mono-color, but with the at least one light source 20 associated with each of the panels 32 being different so that different panels 32 emit different colored lights. As in FIGS. 15G-15I, it should also be appreciated that one or more different colored light-emitting devices 20a may be used with the panels 32".

Figure 5A:
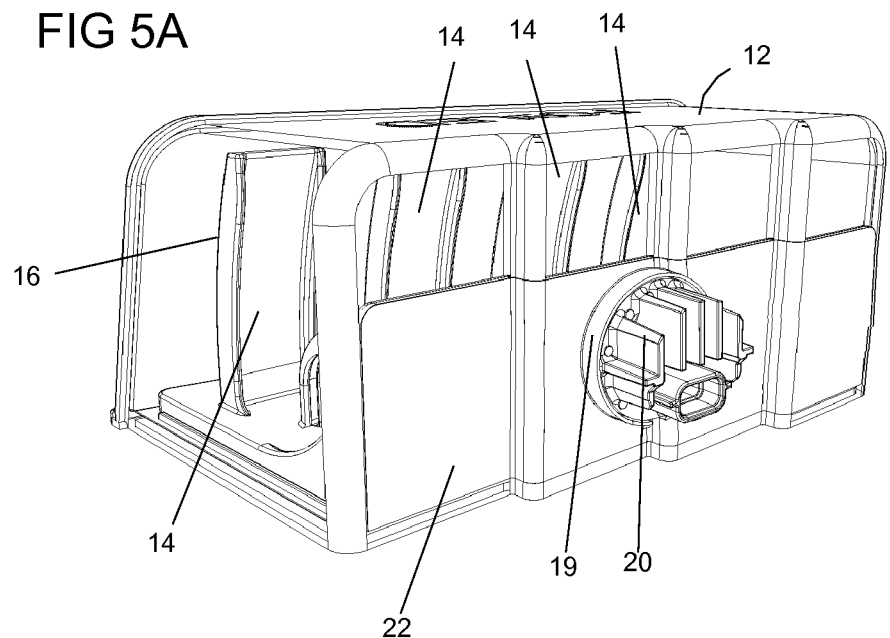
FIGS. 5A-5B illustrate another embodiment showing a single light source used with multiple panels.
Figure 5B:
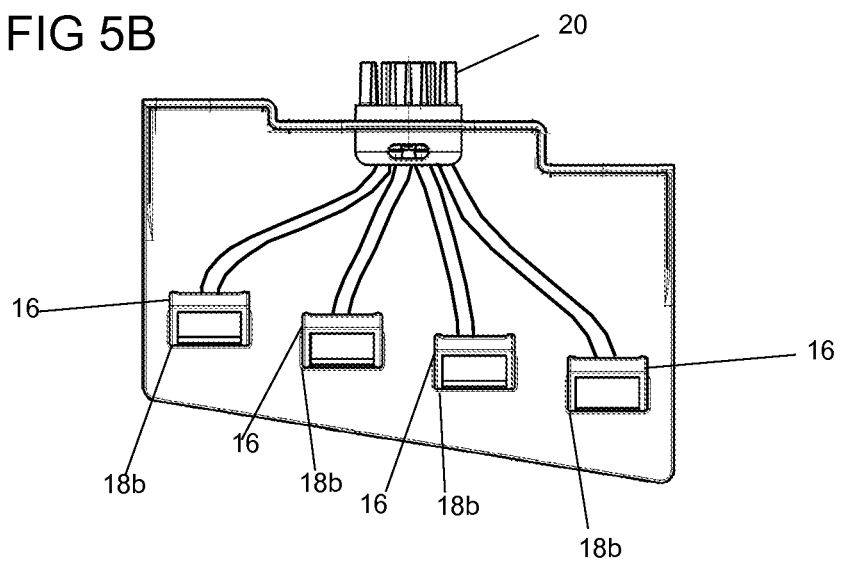
Figure 7:
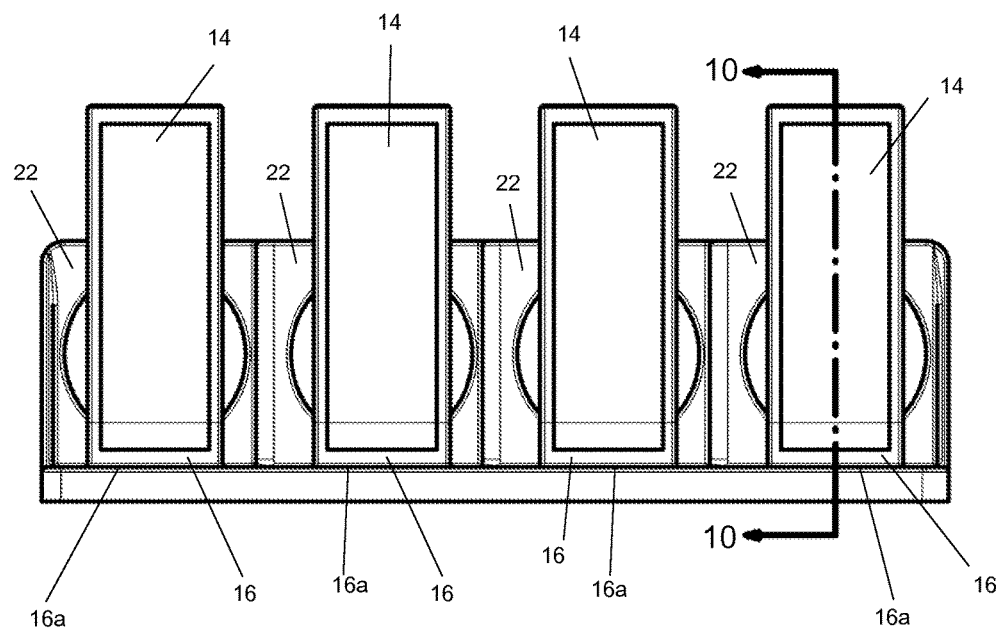
FIG. 7 is a view of a plurality of lighting devices situated in the hosing of FIG. 1A.
Figure 8:
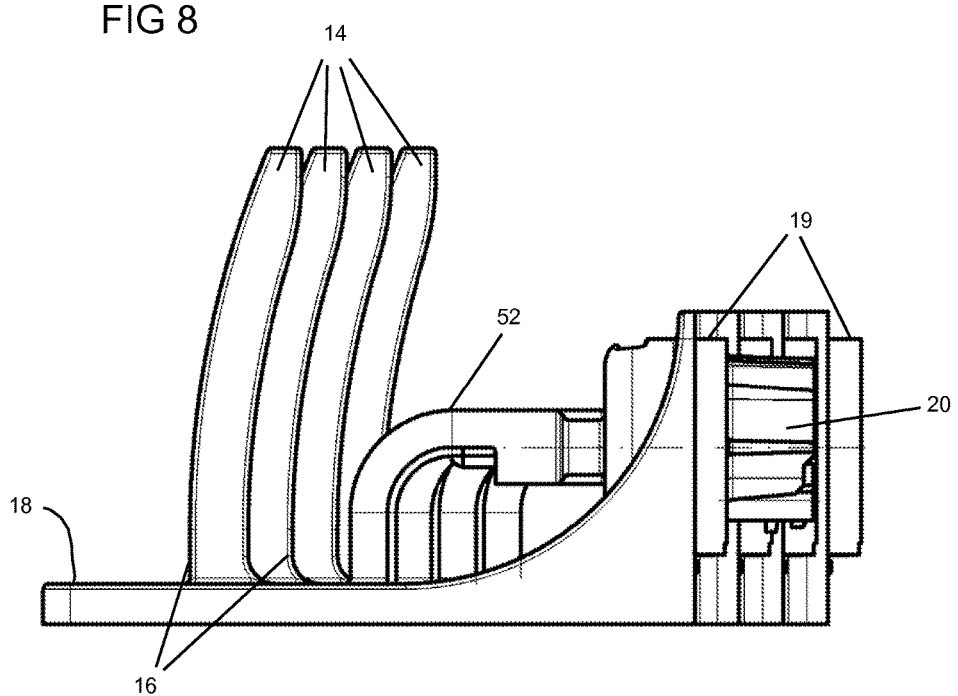
FIG. 8 is a side view of the plurality of lighting devices that are located in the housing of the embodiment of FIG. 1A.
Figure 9:
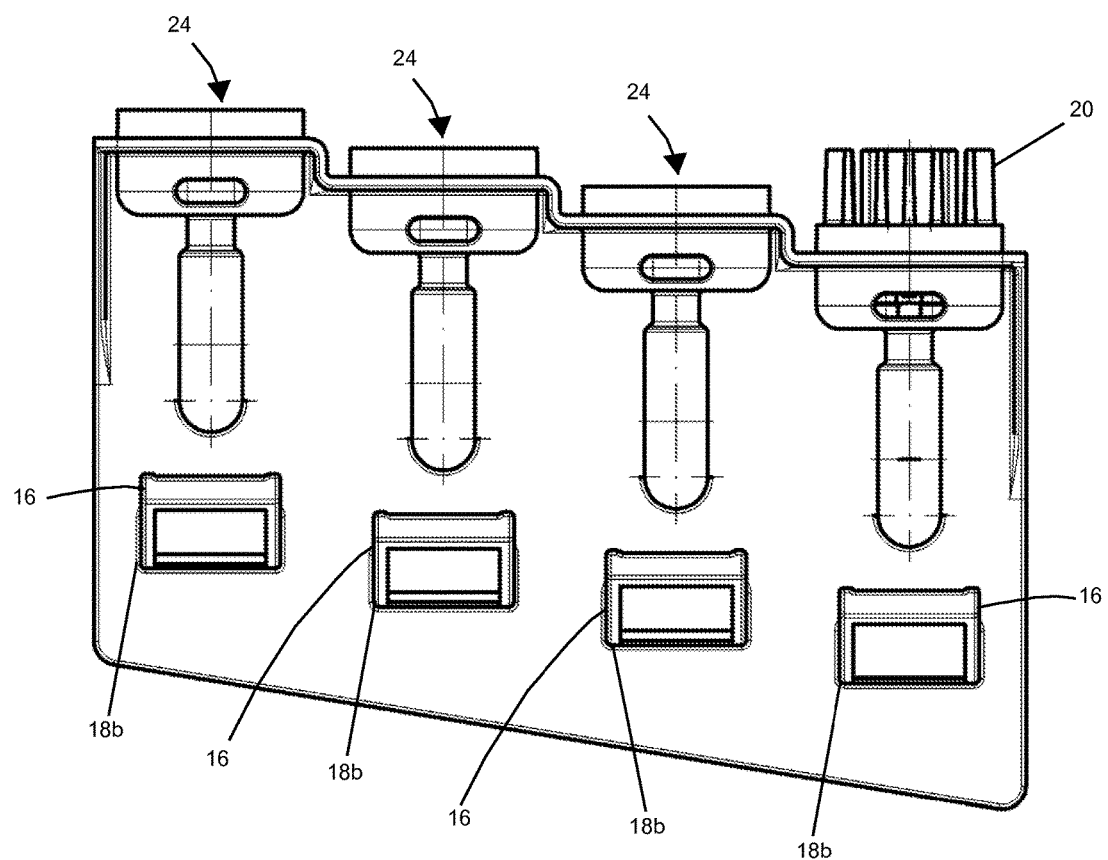
FIG. 9 is a sectional view taken along the line 9-9 in FIG. 5.

It should be understood that the illustrations being described show a single light source 20 associated with each of the panels 32, but a single light source 20 may be used for multiple panels 32, for example, by bundling the ends of the optic fibers 28 and coupling them to a single coupler 46 associated with the single light source 20. FIGS. 5A-5B illustrate a single light source 20' mounted on the wall 22 of the housing 12. This light source 20' is optically coupled to the optical fibers 28 from multiple panels 32. Thus, a single light source 20 can be used with multiple panels 32.

It should also be understood that the support or frame 16 could include a cover lens or optics 81 (FIG. 11A) that facilitate performing a desired function, such as providing a predetermined color, diffusing light emitted by the panel 32 and the like. It should also be understood that the support or frame 16 may be molded with a predetermined mask in one or more of its wall, such as the masks 80-86 shown in FIG. 16A-16D, respectively. For example, the rear wall 14a of the support or frame 16 may be molded to comprise a black or an opaque color in combination with clear or open areas or apertures to create desired shapes, such as alpha-numeric characters (e.g., letters or numbers), a logo, trademark, trade name or the like.

As mentioned earlier, the panel 32 could provide a plurality of colors if the light source 20 is adapted to generate a plurality of different colors, such as if the at least one light source 20 has a plurality of different colored LEDs, such as amber, red or white. In this regard, the microprocessor or controller MC energizes the appropriate LED to perform the desired lighting function and that light would be emitted through the panel 32 in the manner described earlier herein. Different colored LEDs are energized to perform different functions, such as turn sign function, DRL function, stop light function or headlamp function or tail lamp function. Alternatively, the microprocessor or controller MC may energize a plurality of different light sources 20 to cause the lighting device 14 to emit a predetermined or desired light pattern and/or color. This may be advantageous for providing a stylized lighting feature to the vehicle V.

One advantageous feature of the embodiments being described is that the panels 32 are flexible and shapeable as mentioned. The support or frame 16 that receive the panels 32 can be adapted in shape, for example, to match the contour or styling of the vehicle V. The lighting devices 14 and their associated supports or frames 16 may comprise non-planar, two or three dimensional shapes. For example, FIG. 19 illustrates a three-dimensional shape of the panel 32, with it being understood that the support (not shown) is adapted to facilitate defining and holding the panel 32 in the three dimensional shape. Also, the lighting device 14 may comprise a plurality of supports or frames 16 that do not have a consistent or common shape (as is illustrated in the embodiment of FIG. 1A). For example, one support or frame 16 could be curved and another support could be shaped differently. Also, it should be understood that the supports or frames 16 may be arcuate or curved in different planes to provide a two or three dimensional shape or configuration.

With the support or frame 16 being adapted, dimensioned and sized to any desired predetermined shape, the inventors have found that it is possible to put the panels 32 together, such as in a back-to-back format illustrated in FIGS. 15G-15I and 17A-17C and in different configurations to perform different lighting functions. For example, FIGS. 17A-17C illustrates two panels 32"" and 32""" that are situated back-to-back. For ease of illustration, the support or frame 16 is not shown. Note in FIGS. 17A-17C that the panels 32"" and 32""" are twisted in a helical or spiral shape as illustrated so that the panel 32"" can perform a first lighting function (such as displaying a stop light, headlamp or tail lamp) while the panel 32""" performs a second or different lighting function (such as providing an amber turn signal light). FIG. 17C illustrates a similar concept, but with the panels 32"" and 32""" twisted or rotated only one time. Viewing the panels 32"" and 32""" from an opposite side, such as in the direction of arrow C in FIG. 17A, a similar light pattern, but with opposite colors, can be seen. A driver (not shown) may be provided to pivot or rotate the panels 32"" and 32""".

FIG. 17B illustrates two panels 32"" and 32""" situated back-to-back and arranged in a helical configuration as shown. FIG. 17D illustrates yet another embodiment with three panels 32"", 32""", 32"""". Thus, it should be appreciated that the support or frame 16 forms the panels 32"", 32""", 32"""" into the predetermined form shown. It should be appreciated that for each if these embodiments, a support (not shown) may be provided having a frame (not shown) that is adapted to force or urge the back-to-back panels 32 into the spiral or helical configuration shown in FIG. 17B.

Additional Features and Considerations

It should be understood that the panels 32-32"""" may comprise any number of fibers 28 depending on the environment in which they are going to be used. In some of the embodiments, there are approximately fifty (50) fibers of 0.23 mm diameter per panel 32-32"""". Obviously, this is just one illustration and other numbers and sizes of fibers 28 could be used.

Again, and as mentioned earlier herein, fibers 28 from multiple panels 32-32"""" may be bundled together and used in association with a single light source 20 as mentioned earlier herein. In such a case, it may be necessary to provide a coupler (not shown) that is adapted to receive the multiple bundles of fibers 28.

In the illustrations being described, the panels 32 comprise an adhesive on one side to allow for flat distribution of fibers 28 or the fibers 28 are formed in a polymer or resin. It should be understood, however, that many styling opportunities could be used with the panel 32, such as the mask mentioned earlier herein, optics mentioned earlier herein, coloring and the like. It was also mentioned earlier that a reflective material, such as metallized material, may be applied to the entire surface or to portions of the entire surface of both sides 32c and 32d to provide a reflective or masking function. The support or frame 16 may also have a metallized or reflective coating, such as on the rear wall 16b (FIG. 15A).

Note that the fibers 28 between the panel 32 and the light source 20 may be housed in a reflective or opaque material in order to facilitate or minimize loss of light between the light source 20 and the fibers 28 in the panel 32. Also, the conduit 52 may comprise a sleeve or wrapping that also can be metallized or be opaque in order to minimize loss of light during transmission from the light source 20 to the fibers 28 in the panel 32.

Figure 1B:
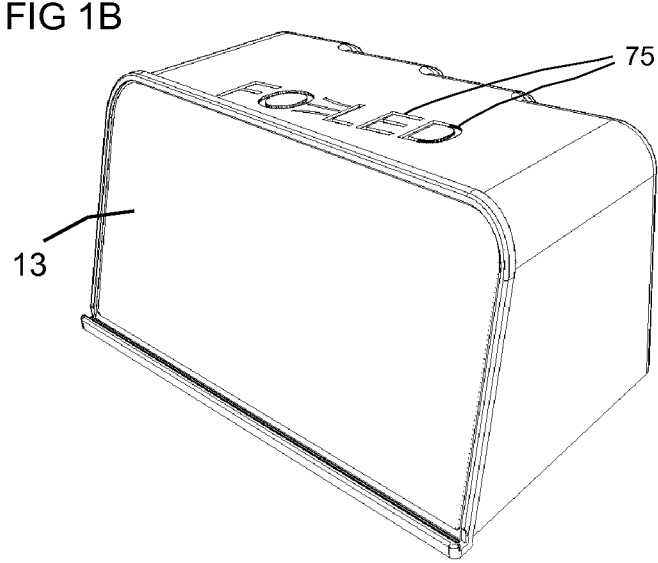
FIG. 1B is another perspective view of the embodiment shown in FIG. 1A with a lens mounted on the housing and showing indicia on the housing.
Figure 1C:
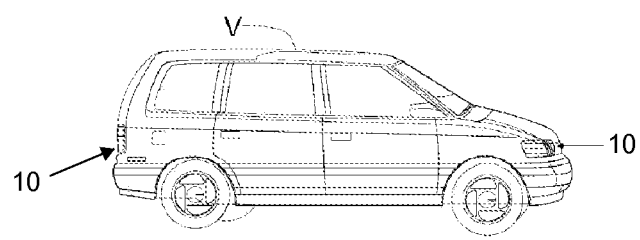
FIG. 1C is a view of a vehicle comprising the embodiment shown in in FIG. 1A.

As mentioned earlier herein, the support or frame 16 could comprise a cover, lens or optics 81 (FIG. 11A). It should also be appreciated that the housing 12 may also comprise a cover 13 (FIGS. 1B and 6). This cover 13 is adapted to be received in the housing 12 and seal the housing 12 from undesired elements. The cover 13 may comprise a lens, colored lens, optics or be transparent if desired.

Advantageously the embodiments described herein are particularly suited for exterior lighting and in environments where it is necessary that the lighting match or conform to the contour or styling of the vehicle V.

The lighting device 14 may also include a driver 90 (FIG. 18) such as a stepper motor, coupled to the panel 32 or to the support or frame 16 in which it is housed. In the example, the support or frame 16 is coupled to wall 18a of the surface 18 of the housing 12 using pivot linkage 92. The driver 90 is under the control of the microprocessor or controller MC that energizes the driver 90 to drive the support or frame 16 to, for example, pivot the support or frame 16 and the panel 32 about the pivot axis PA between a first position to a second position. In such an embodiment, the support or frame 16 is conventionally pivotally coupled to the wall 18a of the surface 18 of the housing 12. In another embodiment illustrated in FIG. 18A, note that the panel and/or support or frame 16 can be flexed from both ends 32a and 32b. Advantageously, this enables the panel 32 to be flexed to a desired curvature or shape.

The support or frame 16 can be made of various materials, including glass, steel, stainless steel, plastic, and as mentioned earlier herein, the support or frame 16 could be colored or transparent. Although not shown, the support or frame 16 may provide a source of light for a light guide or pipe in order to provide another lighting function.

As should be apparent from the foregoing description, when a panel 32 is used in conjunction with other panels 32, a dynamic effect can be achieved.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a vehicle comprising:
a housing;
an array of optical fibers, at least a portion of said array of optical fibers being arranged in at least one predetermined form;
at least one light source to generate light to be transmitted through said array of optical fibers; and
at least one support or frame disposed within said housing, said at least one support or frame comprising a receiving area to receive said at least one predetermined form, and said at least one support or frame providing a lighting function on the vehicle, wherein
said housing further comprises a surface that includes a conduit that defines a passageway to receive said array of optical fibers, and
said at least one predetermined form includes at least one panel, said at least one support or frame defines a frame that includes an aperture, and said at least one panel is received in and framed by said frame such that light from said at least one panel passes through said aperture.

2. The lighting device as recited in claim 1, wherein said lighting device comprises at least one of optics or a mask situated in said at least one support or frame in operative relationship with said predetermined form in order to create a desired light pattern.

3. The lighting device as recited in claim 2, wherein said at least one of optics or said mask comprises at least one lens situated in operative relationship with said at least a portion of said array of optical fibers in order to generate said desired light pattern.

4. The lighting device as recited in claim 1, wherein said aperture is disposed on an outermost face of said frame relative to said vehicle.

5. The lighting device as recited in claim 1, wherein said lighting device comprises a driver to drive said at least one panel from a first position to a second position.

6. The lighting device as recited in claim 1, wherein said array of optical fibers defines a plurality of panels to be received and supported in said at least one support or frame, said plurality of panels cooperating to generate a desired visual effect.

7. The lighting device as recited in claim 6, wherein said lighting device comprises a plurality of light sources associated with said plurality of panels, respectively, said plurality of panels being arranged such that said lighting device performs a plurality of different light functions.

8. The lighting device as recited in claim 7, wherein said plurality of different light functions comprises at least one of a stop light function, a park light function, a daytime running light function, a tail light function or a turn signal function.

9. The lighting device as recited in claim 8, wherein said plurality of different light functions comprises different colors that include at least one of amber or red.

10. The lighting device as recited in claim 1, wherein said at least one light source generates a plurality of different colors, and said at least one light source is under control of a controller so that said at least one panel emits light of different colors to perform different lighting functions.

11. A lighting device for a vehicle comprising:
a housing;
a plurality of support frames located in said housing; and
a plurality of fiber optic light panels received in said plurality of support frames, each of said plurality of fiber optic light panels comprising a plurality of optical fibers, and said plurality of fiber optic panels to receive light from at least one light source to perform at least one lighting function, wherein
each of said plurality of support frames receives a different fiber optic light panel of said plurality of fiber optic light panels, and
each of said plurality of support frames receives more than one of said plurality of fiber optic light panels.

12. The lighting device as recited in claim 11, wherein each of said plurality of support frames comprises a plurality of frame walls that are fastened together to house at least one of said plurality of optic light panels.

13. The lighting device as recited in claim 11, wherein lighting device further comprises at least one of a mask or optics placed in or on one of said plurality of support frames in operative relationship with respect to at least one of said plurality of fiber optic panels.

14. The lighting device as recited in claim 11, wherein each of said plurality of fiber optic light panels has at least one light source associated therewith.

15. The lighting device as recited in claim 11, wherein said plurality of fiber optic panels comprises at least a first panel and a second panel, at least one of said plurality of support frames comprises a first aperture and a second aperture to house both said first panel and said second panel back-to-back so that light from said first panel is emittable through said first aperture and light from said second panel is emittable through said second aperture.

16. The lighting device as recited in claim 15, wherein said at least one lighting function comprises a first light function and a second light function and wherein the light from the first panel is of a first color to perform said first light function and light from said second panel is of a second color to perform said second light function which is different from said first light function.

17. The lighting device as recited in claim 16, wherein said first light function comprises: a stop light function, a turn signal function, a daytime running light function, a headlamp function or a tail lamp function,
said second light function is a different one of said stop light function, turn signal function, daytime running light function, headlamp function or tail lamp function.

18. The lighting device as recited in claim 11, wherein said lighting device further comprises a plurality of couplers associated with a plurality of lighting devices, respectively, each of said plurality of couplers comprising:
a coupling sleeve to receive a bundle of said plurality of optical fibers; and
a light guide coupled to said coupling sleeve to guide light from at least one of said plurality of light sources to said bundle of said plurality of optical fibers.

* * * * *